(12) United States Patent
Moon et al.

(10) Patent No.: US 11,792,426 B2
(45) Date of Patent: Oct. 17, 2023

(54) METHOD AND APPARATUS FOR ENCODING/DECODING IMAGE USING A PREDICTION VALUE BASED ON REFERENCE PIXELS

(71) Applicant: INDUSTRY ACADEMY COOPERATION FOUNDATION OF SEJONG UNIVERSITY, Seoul (KR)

(72) Inventors: Joo Hee Moon, Seoul (KR); Jae Min Ha, Incheon (KR); Dong Jae Won, Seoul (KR); Sung Won Lim, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 17/253,720

(22) PCT Filed: Jun. 18, 2019

(86) PCT No.: PCT/KR2019/007330
§ 371 (c)(1),
(2) Date: Dec. 18, 2020

(87) PCT Pub. No.: WO2019/245261
PCT Pub. Date: Dec. 26, 2019

(65) Prior Publication Data
US 2021/0195238 A1  Jun. 24, 2021

(30) Foreign Application Priority Data

Jun. 18, 2018  (KR) .................. 10-2018-0069607
Jun. 18, 2018  (KR) .................. 10-2018-0069608

(51) Int. Cl.
*H04N 19/593*  (2014.01)
*H04N 19/105*  (2014.01)
(Continued)

(52) U.S. Cl.
CPC ......... *H04N 19/593* (2014.11); *H04N 19/105* (2014.11); *H04N 19/176* (2014.11); *H04N 19/182* (2014.11); *H04N 19/46* (2014.11)

(58) Field of Classification Search
CPC .. H04N 19/593; H04N 19/105; H04N 19/176; H04N 19/182; H04N 19/157; H04N 19/167
See application file for complete search history.

(56) References Cited

U.S. PATENT DOCUMENTS

2014/0092980 A1\* 4/2014 Guo ..................... H04N 19/105
375/240.16
2017/0272757 A1\* 9/2017 Xu ......................... H04N 19/46
(Continued)

FOREIGN PATENT DOCUMENTS

KR  10-2017-0089777 A   8/2017
KR  10-2018-0015598 A   2/2018
(Continued)

OTHER PUBLICATIONS

International Search Report dated Sep. 24, 2019, in counterpart International Patent Application No. PCT/KR2019/007330 (2 pages in English and 2 pages in Korean).

*Primary Examiner* — Francis Geroleo
(74) *Attorney, Agent, or Firm* — NSIP Law

(57) ABSTRACT

Disclosed herein are an image encoding method and an image decoding method. The image decoding method of the present disclosure may include reconstructing reference pixel line information, selecting, based on the reference pixel line information, at least one reference pixel line among a plurality of reference pixel lines, and generating a prediction block for a current block by performing intra prediction for the current block based on the selected reference pixel line.

5 Claims, 32 Drawing Sheets

(51) Int. Cl.
  *H04N 19/176* (2014.01)
  *H04N 19/182* (2014.01)
  *H04N 19/46* (2014.01)

(56) References Cited

U.S. PATENT DOCUMENTS

| | | | |
|---|---|---|---|
| 2017/0347102 A1 | 11/2017 | Panusopone et al. | |
| 2017/0347103 A1* | 11/2017 | Yu | H04N 19/593 |
| 2018/0332284 A1* | 11/2018 | Liu | H04N 19/105 |
| 2019/0082194 A1* | 3/2019 | Chang | H04N 19/11 |
| 2019/0110052 A1* | 4/2019 | Liu | H04N 19/124 |
| 2019/0141318 A1* | 5/2019 | Li | H04N 19/11 |
| 2020/0099925 A1* | 3/2020 | Lee | H04N 19/46 |
| 2020/0236361 A1* | 7/2020 | Jang | H04N 19/159 |

FOREIGN PATENT DOCUMENTS

| | | |
|---|---|---|
| KR | 10-2018-0026718 A | 3/2018 |
| KR | 10-2018-0041575 A | 4/2018 |
| WO | WO 2017/018664 A | 2/2017 |

* cited by examiner

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

2601

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 61 | 59 | 54 | 53 | 41 | 30 | 20 | 10 |
| Prob of 0(%) | 5 | 9 | 13 | 18 | 24 | 29 | 31 | 34 | 39 | 41 | 46 | 47 | 59 | 70 | 80 | 90 |

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 73 | 69 | 66 | 61 | 59 | 54 | 53 | 41 | 30 | 20 | 10 |
| Prob of 0(%) | 5 | 9 | 13 | 18 | 24 | 27 | 31 | 34 | 39 | 41 | 46 | 47 | 59 | 70 | 80 | 90 |

2701

| idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Prob of 1(%) | 95 | 91 | 87 | 82 | 76 | 71 | 69 | 66 | 63 | 59 | 54 | 53 | 41 | 30 | 20 | 10 |
| Prob of 0(%) | 5 | 9 | 13 | 18 | 24 | 29 | 31 | 34 | 37 | 41 | 46 | 47 | 59 | 70 | 80 | 90 |

“METHOD AND APPARATUS FOR ENCODING/DECODING IMAGE USING A PREDICTION VALUE BASED ON REFERENCE PIXELS

CROSS REFERENCE TO RELATED APPLICATIONS

This application is a U.S. National Stage Application of International Application No. PCT/KR2019/007330, filed on Jun. 18, 2019, which claims the benefit under 35 USC 119(a) and 365(b) of Korean Patent Application No. 10-2018-0069607, filed on Jun. 18, 2018, and Korean Patent Application No. 10-2018-0069608, filed on Jun. 18, 2018 in the Korean Intellectual Property Office, the entire disclosure of which is incorporated herein by reference for all purposes.

TECHNICAL FIELD

The present disclosure relates to an image encoding/decoding method and apparatus. More particularly, the present disclosure relates to an image encoding/decoding method and apparatus for performing intra prediction using a plurality of reconstructed pixel lines.

BACKGROUND ART

In recent years, demand for multimedia data such as video has been rapidly increasing on the Internet. However, the pace of advancement in the bandwidth of a channel can hardly follow the amount of multimedia data on a rapid increase. Accordingly, among international standardization organizations, ITU-T's VCEG (Video Coding Expert Group) and ISO/IEC's MPEG (Moving Picture Expert Group) established the HEVC (High Efficiency Video Coding) version 1, which is a video compression standard, in February 2014.

HEVC defines techniques such as intra prediction, inter prediction, transform, transform, quantization, entropy coding and in-loop filter.

DISCLOSURE

Technical Problem

The present disclosure is directed to provide an image encoding/decoding method and apparatus for performing intra prediction using a plurality of reference pixel lines.

Also, the present disclosure is directed to provide an image encoding/decoding method and apparatus for performing efficient entropy encoding and decoding.

Also, the present disclosure is directed to provide a recording medium storing a bitstream generated by an image encoding method or apparatus of the present disclosure.

Also, the present disclosure is directed to provide a recording medium storing a bitstream generated by an image decoding method or apparatus of the present disclosure.

The technical objects of the present disclosure are not limited to the above-mentioned technical objects, and other technical objects that are not mentioned will be clearly understood by those skilled in the art through the following descriptions.

Technical Solution

An image decoding method according to one aspect of the present disclosure may include reconstructing reference pixel line information, selecting, based on the reference pixel line information, at least one reference pixel line among a plurality of reference pixel lines, and generating a prediction block for a current block by performing intra prediction for the current block based on the selected reference pixel line.

In the image decoding method according to the present disclosure, the reference pixel line information may be decoded in units of blocks.

In the image decoding method according to the present disclosure, the prediction block may be generated by performing a weighted sum between an upper reference pixel of the current block and a left reference pixel of the current block.

In the image decoding method according to the present disclosure, the upper reference pixel and the left reference pixel may be selected based on a prediction direction of the current block.

In the image decoding method according to the present disclosure, the upper reference pixel and the left reference pixel are present on a first reference pixel line adjacent to the current block, and the upper reference pixel and the left reference pixel may be selected based on a coordinate of a current pixel within the current block.

In the image decoding method according to the present disclosure, when the coordinate of an upper left pixel in the current block is (0, 0) and the coordinate of the current pixel is (x, y), the coordinate of the upper reference pixel may be (x+y+1, −1), and the coordinate of the left reference pixel may be (−1, x+y+1).

In the image decoding method according to the present disclosure, a weight used for the weighted sum may be determined based on a distance from the current pixel in the current block to the upper reference pixel and the left reference pixel.

In the image decoding method according to the present disclosure, a greater weight may be applied to one of the upper reference pixel and the left reference pixel that has a shorter distance from the current pixel.

An image encoding method according to another aspect of the present disclosure may include selecting at least one reference pixel line among a plurality of reference pixel lines, generating a prediction block for a current block by performing intra prediction for the current block based on the selected reference pixel line, and encoding reference pixel line information on the selected reference pixel line.

In the image encoding method according to the present disclosure, the reference pixel line information may be encoded in units of blocks.

In the image encoding method according to the present disclosure, the prediction block may be generated by performing a weighted sum between an upper reference pixel of the current block and a left reference pixel of the current block.

In the image encoding method according to the present disclosure, the upper reference pixel and the left reference pixel may be selected based on a prediction direction of the current block.

In the image encoding method according to the present disclosure, the upper reference pixel and the left reference pixel are present on a first reference pixel line adjacent to the current block, and the upper reference pixel and the left reference pixel may be selected based on a coordinate of a current pixel within the current block.

In the image encoding method according to the present disclosure, when the coordinate of an upper left pixel in the current block is (0, 0) and the coordinate of the current pixel is (x, y), the coordinate of the upper reference pixel may be (x+y+1, −1), and the coordinate of the left reference pixel may be (−1, x+y+1).

In the image encoding method according to the present disclosure, a weight used for the weighted sum may be determined based on a distance from the current pixel in the current block to the upper reference pixel and the left reference pixel.

In the image encoding method according to the present disclosure, a greater weight may be applied to one of the upper reference pixel and the left reference pixel that has a shorter distance from the current pixel.

An image encoding method according to yet another aspect of the present disclosure may include receiving a coding parameter, performing a probability initialization, determining binary information of the coding parameter, encoding the binary information, and updating a probability table according to a characteristic of the coding parameter.

In the image encoding method according to the present disclosure, there are K characteristics of the coding parameter and K probability tables. Here, K may be two or more.

In the image encoding method according to the present disclosure, the K probability tables may have the same or different initial probability information, and information on whether the initial probability information is the same or different may be signaled at a higher level of block.

In the image encoding method according to the present disclosure, the characteristic of the coding parameter may be whether or not to perform secondary transform.

In the image encoding method according to the present disclosure, whether or not to perform the secondary transform may be determined according to whether the position of a current coefficient is a primary transform region or a secondary transform region.

In the image encoding method according to the present disclosure, the secondary transform region may be determined based on the position of a last non-zero coefficient in a scan order.

In the image encoding method according to the present disclosure, the secondary transform region may be a sub-block region specified by the position of an upper left coefficient of a current block and the position of the last non-zero coefficient.

In the image encoding method according to the present disclosure, the information on the secondary transform region may be signaled through a bitstream.

In the image encoding method according to the present disclosure, the characteristic of the coding parameter may be a prediction mode of the current block.

In the image encoding method according to the present disclosure, the characteristics of the coding parameter are whether the secondary transform is performed and the prediction mode of the current block, and four probability tables may be used for encoding the coding parameter.

An image decoding method according to yet another aspect of the present disclosure may include receiving a bitstream, performing a probability initialization, decoding binary information of a coding parameter, determining information of the coding parameter, and updating a probability table according to a characteristic of the coding parameter.

In the image decoding method according to the present disclosure, there are K characteristics of the coding parameter and K probability tables. Here, K may be two or more.

In the image decoding method according to the present disclosure, the K probability tables may have the same or different initial probability information, and information on whether the initial probability information is the same or different may be signaled at a higher level of block.

In the image decoding method according to the present disclosure, the characteristic of the coding parameter may be whether or not to perform secondary transform.

In the image decoding method according to the present disclosure, whether or not to perform the secondary transform may be determined according to whether the position of a current coefficient is a primary transform region or a secondary transform region.

In the image decoding method according to the present disclosure, the secondary transform region may be determined based on the position of a last non-zero coefficient in a scan order.

In the image decoding method according to the present disclosure, the secondary transform region may be a sub-block region specified by the position of an upper left coefficient of a current block and the position of the last non-zero coefficient.

In the image decoding method according to the present disclosure, the information on the secondary transform region may be signaled through a bitstream.

In the image decoding method according to the present disclosure, the characteristic of the coding parameter may be a prediction mode of the current block.

In the image decoding method according to the present disclosure, the characteristics of the coding parameter are whether the secondary transform is performed and the prediction mode of the current block, and four probability tables may be used for decoding the coding parameter.

A computer readable recording medium according to yet another aspect of the present disclosure may store a bitstream generated by an image encoding method and/or apparatus according to the present disclosure.

A computer readable recording medium according to yet another aspect of the present disclosure may store a bitstream generated by an image decoding method and/or apparatus according to the present disclosure.

Advantageous Effects

According to the present disclosure, an image encoding/decoding method and apparatus for performing intra prediction using a plurality of reference pixel lines may be provided.

Also, according to the present disclosure, a method and apparatus for predicting a current block by using a plurality of prediction blocks that are generated based on multiple pieces of prediction information may be provided.

Also, according to the present disclosure, an image encoding/decoding method and apparatus for performing efficient entropy encoding and decoding may be provided.

Also, according to the present disclosure, the amount of encoded information generated as a result of encoding a video may be reduced, thereby improving the encoding efficiency.

Also, according to the present disclosure, the performance of arithmetic coding and arithmetic decoding may be improved by effectively selecting probability information that is applied when encoding or decoding each symbol in context-adaptive arithmetic coding and decoding.

Also, according to the present disclosure, a computer-readable recording medium for storing a bitstream that is generated by an image encoding method/apparatus according to the present disclosure may be provided.

Also, according to the present disclosure, a computer-readable recording medium for storing a bitstream that is decoded by an image decoding method/apparatus according to the present disclosure may be provided.

DESCRIPTION OF DRAWINGS

FIG. 28 is a view illustrating an example in which probability information is applied differently according to information on peripheral coefficients.

FIG. 29 is a view illustrating an example of updated probability information.

MODE FOR INVENTION

Figure 1:
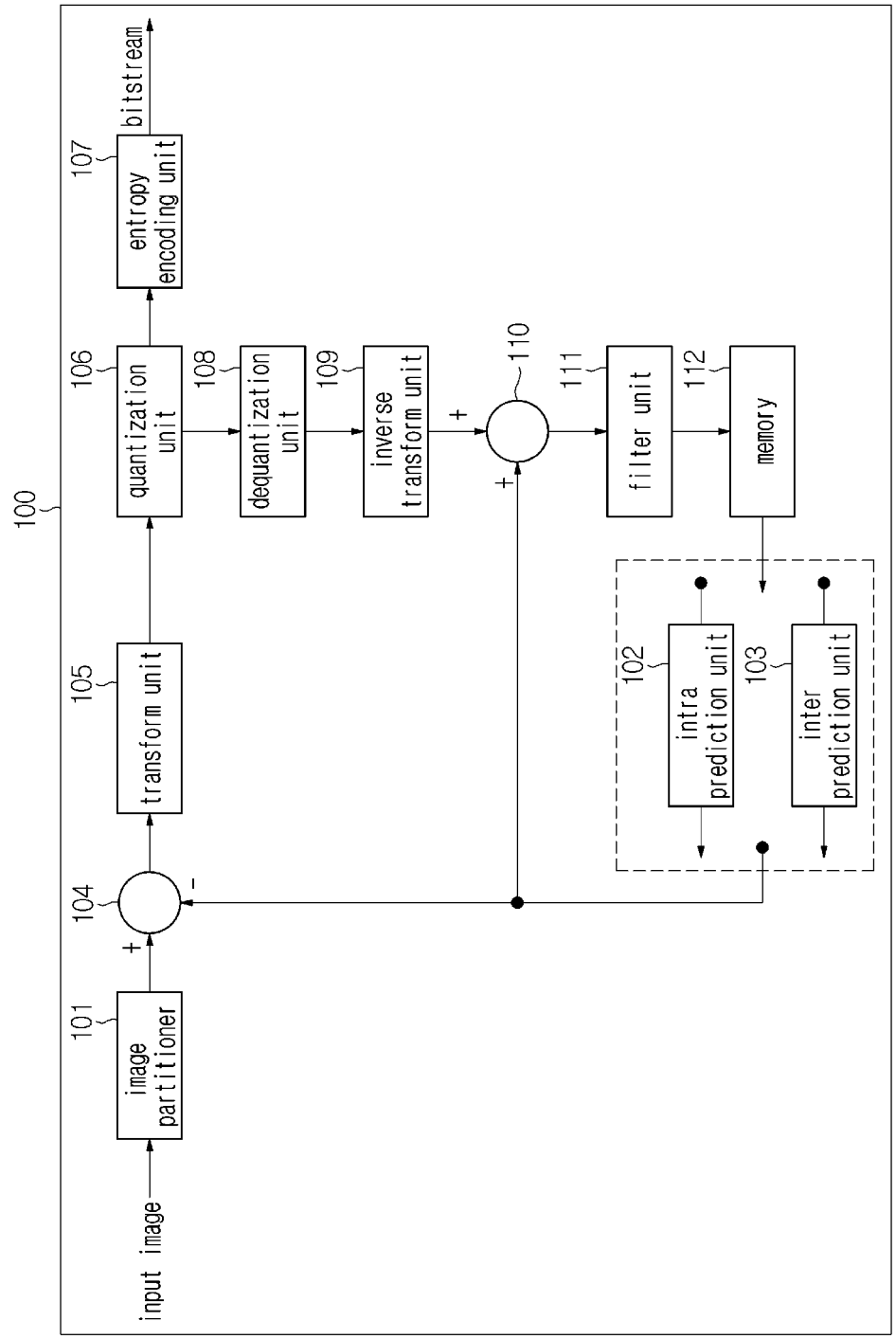
FIG. 1 is a view briefly illustrating a configuration of an image encoding apparatus.

Embodiments of the present disclosure will be described in detail with reference to the accompanying drawings so that they may be easily implemented by those skilled in the art. However, the present disclosure may be embodied in many different forms and is not limited to the embodiments described herein. In addition, in order to clearly describe the present disclosure, parts not related to the description are omitted from the drawings, and like parts are denoted by similar reference numerals throughout the entire specification.

In the present specification, when a part is 'connected' to another part, this includes not only a case where the parts are directly connected, but also a case where the parts are electrically connected with another element between them.

Also, in the present specification, when a part is referred to as "comprising" a component, it may mean further inclusion of another component not the exclusion thereof, unless explicitly described to the contrary.

Also, terms like 'first', 'second', etc. may be used to describe various components, but the components are not to be construed as being limited to the terms. The terms are only used to differentiate one component from other components.

Also, in the embodiments of the apparatus and method described herein, some of the configuration of the apparatus or some of the steps of the method may be omitted. In addition, the order of some components of the apparatus or some steps of the method may be changed. In addition, another configuration or another step may be inserted into a part of the configuration of the apparatus or a part of the steps of the method.

Also, some components or some steps of a first embodiment of the present disclosure may be added to a second embodiment or may replace some components or steps of the second embodiment.

Furthermore, constitutional parts shown in the embodiments of the present disclosure are independently shown so as to represent characteristic functions different from each other. Thus, it does not mean that each constitutional part constitutes a constitutional unit of separated hardware or software. In other words, each constitutional part is described as each of enumerated constitutional parts for convenience. At least two constitutional parts of each constitutional part may be combined to form one constitutional part or one constitutional part may be divided into a plurality of constitutional parts to perform each function. The integrated and separated embodiments of each of these constitutional parts are also included within the scope of the present disclosure when not departing from the spirit of the present disclosure.

First, the terms used in the present application will be briefly described as follows.

A video decoding apparatus to be described below may be an apparatus included in a civil security camera, a civil security system, a military security camera, a military security system, a personal computer (PC), a notebook computer, a portable multimedia player (PMP), a wireless communication terminal, a smartphone, and a server terminal like a TV application server and a service server. It may mean a user terminal and other various devices, a communication apparatus like a communication modem for communicating with a wired or wireless communication network, and a variety of apparatuses equipped with a memory for storing various programs and data for inter- or intra-prediction for decoding or encoding an image, and a microprocessor for computing and controlling by executing a program.

In addition, an image that is encoded in the bitstream by an encoder may be decoded, reconstructed and played after being transmitted to an image decoding apparatus in real time or non-real time through a wired or wireless communication network like the Internet, a local area wireless communication network, a wireless LAN network, a WiBro network, and a mobile communication network or through various communication interfaces like cable and a universal serial bus (USB). Alternatively, a bitstream generated by a decoder may be stored in a memory. The memory may include both a volatile memory and a nonvolatile memory. In the present specification, a memory may be represented as a recording medium that stores a bitstream.

Typically, a video may be composed of a series of pictures, and each picture may be divided into a coding unit such as a block. In addition, those skilled in the art, to which the present embodiment appertains, will be able to understand that the term "picture" described below may be used interchangeably with other terms having an equivalent meaning like "image" and "frame". In addition, those skilled in the art, to which the present embodiment appertains, will be able to understand that the term "coding unit" may be used interchangeably with other terms having an equivalent meaning like "unit block" and "block".

Hereinafter, with reference to the accompanying drawings, the embodiments of the present disclosure will be described in further detail. While the present disclosure is being described, a duplicate description for a same component will be omitted.

FIG. 1 is a view briefly illustrating a configuration of an image encoding apparatus.

An image encoding apparatus 100 may include an image partitioner 101, an intra prediction unit 102, an inter prediction unit 103, a subtractor 104, a transform unit 105, a quantization unit 106, an entropy encoding unit 107, a dequantization unit 108, an inverse transform unit 109, an adder 110, a filter unit 111, and a memory 112.

RateDistortion-cost (RD-Cost) may be compared to select best information in each apparatus. The RD-Cost refers to a cost value calculated by using distortion information between an original block and a reconstructed block and a bit rate generated when transmitting a prediction mode. Herein, a sum of absolute difference (SAD), a sum of absolute transformed difference (SATD), and a sum of square for error (SSE) may be used to calculate the cost value.

As each constitutional part in FIG. 1 is independently illustrated so as to represent characteristic functions different from each other in an image encoding apparatus, it does not mean that the each constitutional part constitutes a separate constitutional unit of hardware or software. In other words, for convenience of description, constitutional parts are included by being enumerated respectively. However, at least two of the constitutional parts may be combined to form one constitutional part or one constitutional part may be divided into a plurality of constitutional parts to perform each function, and both of such integrated and separate embodiments are included in the scope of the present disclosure, if not departing from the essence of the present disclosure.

In addition, some components may not be indispensable components performing essential functions of the present disclosure but may be optional components for improving performance. The present disclosure may be implemented by including only indispensable constitutional parts for implementing the essence of the present disclosure except components that are used only to improve performance. A structure including only indispensable components except optional components used in improving performance is also included in the scope of the present disclosure.

The image partitioner 101 may partition an input image into at least one block. Herein, the input image may have various shapes and sizes such as a picture, a slice, a tile and a segment. A block may mean a coding unit (CU), a prediction unit (PU), or a transform unit (TU). The partitioning may be performed based on at least one of a quad tree, a binary tree and a ternary tree. The quad tree is a method of dividing an upper block into four quadrant lower blocks so that the width and height of each quadrant are half the width and height of the upper block. The binary tree is a method of dividing an upper block into two lower blocks so that either the width or height of each lower block is half the width or height of the upper block. The ternary tree is a method of dividing an upper block into lower blocks based on either a width or a height. A block may have a non-square shape as well as a square shape through partitioning based on the above-described binary tree and ternary tree.

The prediction units 102 and 103 may include the inter prediction unit 103 for performing inter prediction and the intra prediction unit 102 for performing intra prediction. It is possible to determine whether to use inter prediction or intra prediction for a prediction unit and to determine specific information (e.g., an intra prediction mode, a motion vector, a reference picture) according to each prediction method. Herein, a processing unit for performing prediction and a processing unit for determining a prediction method and specific content may be different from each other. For example, a prediction method and a prediction mode may be determined in a prediction unit, and prediction may be performed in a transform unit.

A residual value (residual bloc) between a generated prediction block and an original block may be input into the transform unit 105. In addition, information on a prediction mode used for prediction and information on a motion vector may be encoded together with a residual value in the entropy encoding unit 107 and be transmitted to a decoder. When using a specific encoding mode, an original block maybe encoded as it is and be transmitted to a decoder without generating a prediction block through the prediction units 102 and 103.

The intra prediction unit 102 may generate a prediction block based on information on a reference pixel around a current block, that is, pixel information in a current picture. When a prediction mode of a neighboring block of a current block, on which intra prediction is to be performed, is inter prediction, a reference pixel included in a neighboring block to which inter prediction is applied may be replaced by a reference pixel in another neighboring block to which intra prediction is applied. That is, when a reference pixel is not available, information on the unavailable reference pixel may be replaced by at least one of available reference pixels.

In intra prediction, a prediction mode may have an angular prediction mode that uses reference pixel information according to a prediction direction and a non-angular mode that uses no directional information. A mode for predicting luma information and a mode for predicting chroma information may be different from each other. Information on an intra prediction mode that is used for predicting luma information or information on a predicted luma signal may be utilized to predict chroma information.

The intra prediction unit 102 may include an adaptive intra smoothing (AIS) filter, a reference pixel interpolation unit, and a DC filter. The AIS filter is a filter for filtering a reference pixel of a current block, and it may adaptively determine whether to apply the filter according to a prediction mode of a current prediction unit. When a prediction mode of a current block is a mode that does not perform AIS filtering, the AIS filter may not be applied.

A reference pixel interpolation unit of the intra prediction unit 102 may interpolate a reference pixel and thus generate a reference pixel at a position in fractional units, when an intra prediction mode of a current unit is a mode for performing intra prediction based on a pixel value that is obtained by interpolating a reference pixel. When a prediction mode of a current prediction unit is not a prediction mode that generates a prediction block without interpolating a reference pixel, the reference pixel may not be interpolated. When a prediction mode of a current block is a DC mode, the DC filter may generate a prediction block through filtering.

The inter prediction unit 103 generates a prediction block by using an already reconstructed reference image and motion information that are stored in the memory 112. Motion information may include, for example, a motion vector, a reference picture index, a list 1 prediction flag, and a list 0 prediction flag.

A residual block including a prediction unit, which is generated in the prediction units 102 and 103 and residual information, which is a difference between the prediction unit and an original block, may be generated. The residual block thus generated may be input into the transform unit 105 and be transformed.

The inter prediction unit 103 may derive a prediction block based on information on at least one of the earlier picture and the later picture of a current picture. In addition, a prediction block of a current block may be derived based on information on some regions in a current picture where encoding is completed. The inter prediction unit 103 according to an embodiment of the present disclosure may include a reference picture interpolation unit, a motion prediction unit, and a motion compensation unit.

In a reference picture interpolation unit, reference picture information may be provided from the memory 112. Pixel information of an integer pixel or less may be generated in a reference picture. In the case of a luma pixel, a DCT-based 8-tap interpolation filter having different filter coefficients may be used to generate pixel information of an integer pixel or less in ¼ pixel unit. In the case of a chroma signal, a DCT-based 4-tap interpolation filter having different filter coefficients may be used to generate pixel information of an integer pixel or less in ⅛ pixel unit.

A motion prediction unit may perform motion prediction based on a reference picture that is interpolated by a reference picture interpolation unit. A full search-based block matching algorithm (FBMA), a three step search (TSS), a new three-step search algorithm (NTS) and other various methods may be used to calculate a motion vector. A motion vector may have a motion vector value in ½ or ¼ pixel units based on an interpolated pixel. In a motion prediction unit, a prediction block of a current block may be predicted by using different motion prediction methods. Various methods like a skip method, a merge method, and an advanced motion vector prediction method may be used as a motion prediction method.

The subtractor 104 generates a residual block of a current block by subtracting a prediction block, which is generated by the intra prediction unit 102 or the inter prediction 103, from a block to be currently encoded.

The transform unit 105 may transform a residual block including residual data by using a transform method like DCT, DST and Karhunen Loeve Transform (KLT). Herein, a transform method may be determined based on an intra prediction mode of a prediction unit that is used to generate a residual block. For example, according to an intra prediction mode, DCT may be used in the horizontal direction and DST may be used in the vertical direction. Alternatively, different transform methods may be used in the horizontal direction and in the vertical direction according to the aspect ratio and size of a current block.

The quantization unit 106 may quantize values that are converted into a frequency domain in the transform unit 105. A quantization coefficient may vary according to a block or according to the importance of an image. A value calculated by the quantization unit 106 may be provided to the dequantization unit 108 and the entropy encoding unit 107.

The transform unit 105 and/or the quantization unit 106 may be selectively included in the image encoding apparatus 100. That is, the image encoding apparatus 100 may perform at least one of transform and quantization for residual data of a residual block or may encode a residual block by skipping both transform and quantization. Even when either transform or quantization is not performed in the image encoding apparatus 100 or neither transform or quantization is not performed, a block that is input into the entropy encoding unit 107 is conventionally referred to as a transform block.

The entropy encoding unit 107 entropy encodes input data. Entropy encoding may use various encoding methods like exponential Golomb, context-adaptive variable length coding (CAVLC), context-adaptive binary arithmetic coding (CABAC), etc.

The entropy encoding unit 107 may encode various information like coefficient information of a transform block, block type information, prediction mode information, partition unit information, prediction unit information, transmission unit information, motion vector information, reference frame information, interpolation information of a block, and filtering information. Coefficients of a transform block may be encoded in sub-block units in the transform block.

For encoding of a coefficient of a transform block, Last_sig that is a syntax element for indicating a position of a first non-zero coefficient in an inverse scan order, Coded_sub_blk_flag that is a flag for indicating whether or not there is at least one non-zero coefficient in a sub-block, Sig_coeff_flag that is a flag for indicating whether a coefficient is a non-zero coefficient or not, Abs_greater1_flag that is a flag for indicating whether or not the absolute value of a coefficient is greater than 1, Abs_greater2_flag that is a flag for indicating whether or not the absolute value of a coefficient is greater than 2, Sign_flag that is a flag for signifying a sign of a coefficient, and other various syntax elements may be encoded. A residual value of a coefficient that is not encoded through the syntax elements may be encoded through the syntax element remaining_coeff.

The dequantization unit 108 dequantizes values that are quantized in the quantization unit 106, and the inverse transform unit 109 inverse-transforms values that are transformed in the transform unit 105. Residual values generated by the dequantization unit 108 and the inverse transform unit 109 may be merged with a prediction unit, which is predicted through a motion estimation unit, a motion compensation unit and the intra prediction unit 102 included in the prediction units 102 and 103, thereby generating a reconstructed block. The adders 110 generates a reconstructed block by adding a prediction block, which is generated in the prediction units 102 and 103, and a residual block generated through the inverse transform unit 109.

The filter unit 111 may include at least one of a deblocking filter, an offset correction unit, and an adaptive loop filter (ALF).

A deblocking filter may remove block distortion that is generated due to a boundary between blocks in a reconstructed picture. In order to determine whether or not to perform deblocking, whether or not to apply a deblocking filter to a current block may be determined based on pixels included in several columns or rows of a block. When a deblocking filter is applied to a block, a strong filter or a weak filter may be applied according to a necessary deblocking filtering strength. In addition, when the vertical filtering and the horizontal filtering are performed for applying a deblocking filter, the horizontal filtering and the vertical filtering may be set to be processed concurrently.

An offset correction unit may correct an offset with an original image in pixel units for an image in which deblocking is performed. In order to perform offset correction for a specific picture, a method of partitioning pixels included in an image into a predetermined number of regions, determining a region in which offset is to be performed, and applying offset to the region may be used. Alternatively, a method of applying offset in consideration of edge information of each sample may be used.

Adaptive loop filtering (ALF) may be performed based on a value that is obtained by comparing a filtered reconstructed image and an original image. After pixels included in an image are divided into a predetermined number of groups, a filter to be applied to a corresponding group may be determined to differentially perform filtering on each group. Information on whether or not to apply ALF may be transmitted by coding unit (CU), and the shape and filter coefficient of an adaptive loop filter to be applied may vary according to each block. In addition, an adaptive loop filter with a same shape (fixed shape) may be applied, irrespective of the feature of a block to which the adaptive loop filter is to be applied.

The memory 112 may store a reconstructed block or picture calculated by the filter unit 111, and the reconstructed block or picture thus stored may be provided to the prediction units 102 and 103 when performing inter prediction.

Figure 2:
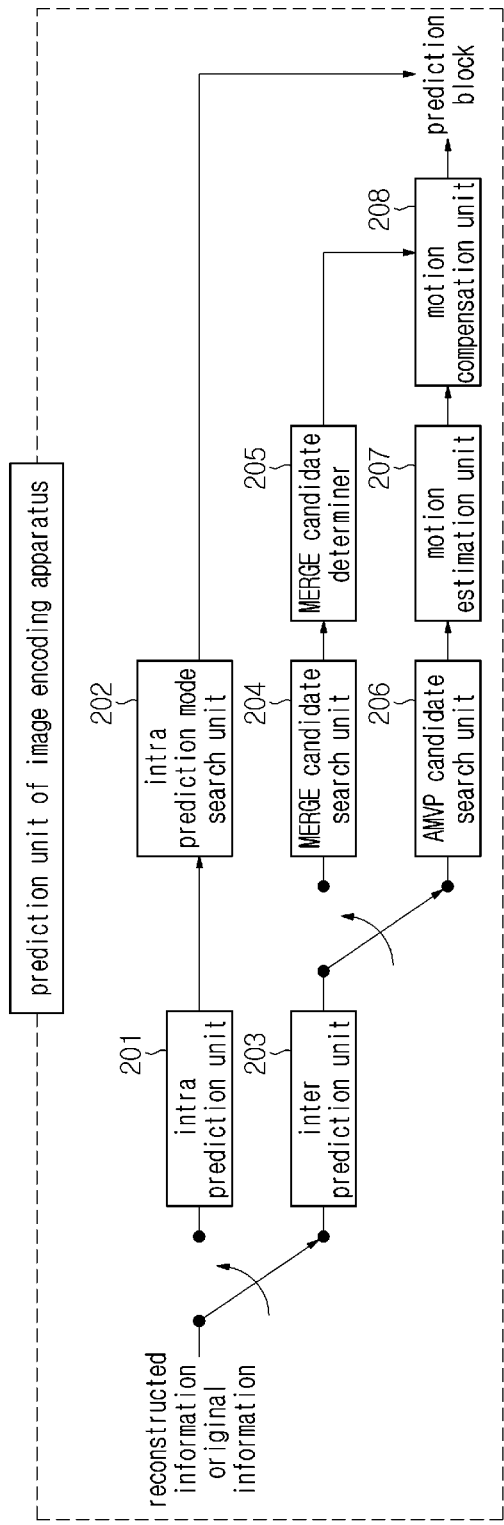
FIG. 2 is a view illustrating an embodiment of a prediction unit of an image encoding apparatus.

FIG. 2 is a view illustrating an embodiment of a prediction unit of an image encoding apparatus.

When a prediction mode of a current block is an intra prediction mode, an intra prediction unit 201 may generate a reference pixel by deriving the reference pixel from around a current block and filtering the reference pixel. A reference pixel is determined using a reconstructed pixel around a current block. When some reconstructed pixels around a current block are not available or there is no reconstructed pixel around the current block, an available reference pixel may be padded to an unavailable region or by using a middle value of a range that a pixel may have. After deriving every reference pixel, the reference pixel may be filtered using an adaptive intra smoothing (AIS) filter.

An intra prediction mode search unit 202 may determine one of M intra prediction modes. Here, M represents a total number of intra prediction modes. An intra-prediction mode may include an angular mode or a non-angular mode.

A prediction block is generated using a determined prediction mode and a filtered reference pixel. One intra prediction mode with lowest cost maybe selected by comparing RD-cost in each intra prediction mode.

An inter prediction unit 203 may be divided into a merge candidate search unit 204 and an AMVP candidate search unit 206 according to a method of deriving motion information. The merge candidate search unit 204 sets a reference block, in which inter prediction is used, among reconstructed blocks around a current block, as a merge candidate. A merge candidate is derived using a same method in an encoding/decoding apparatus, and the same number of merge candidates is used. The number of merge candidates is transmitted from an encoding apparatus to a decoding apparatus or a predetermined number is used. When the number of merge candidates derived from a reconstructed reference block around a current block does not reach a predetermined number, motion information of a block existing in the same position as the current block in another picture not a current picture may be used as a merge candidate. Alternatively, a merge candidate that is needed may be derived by combining motion information of the past direction and motion information of the future direction. Alternatively, a block in the same position of another reference picture may be set as a merge candidate.

The AMVP candidate search unit 206 determines motion information of a current block in a motion estimation unit 207. The motion estimation unit 207 finds a prediction block most similar to a current block from reconstructed pictures.

When inter prediction is performed, motion information of a current block is determined by using one of the merge candidate search unit 204 and the AMVP candidate search unit 206, and a motion compensation unit 208 generates a prediction block based on the determined motion information.

Figure 3:
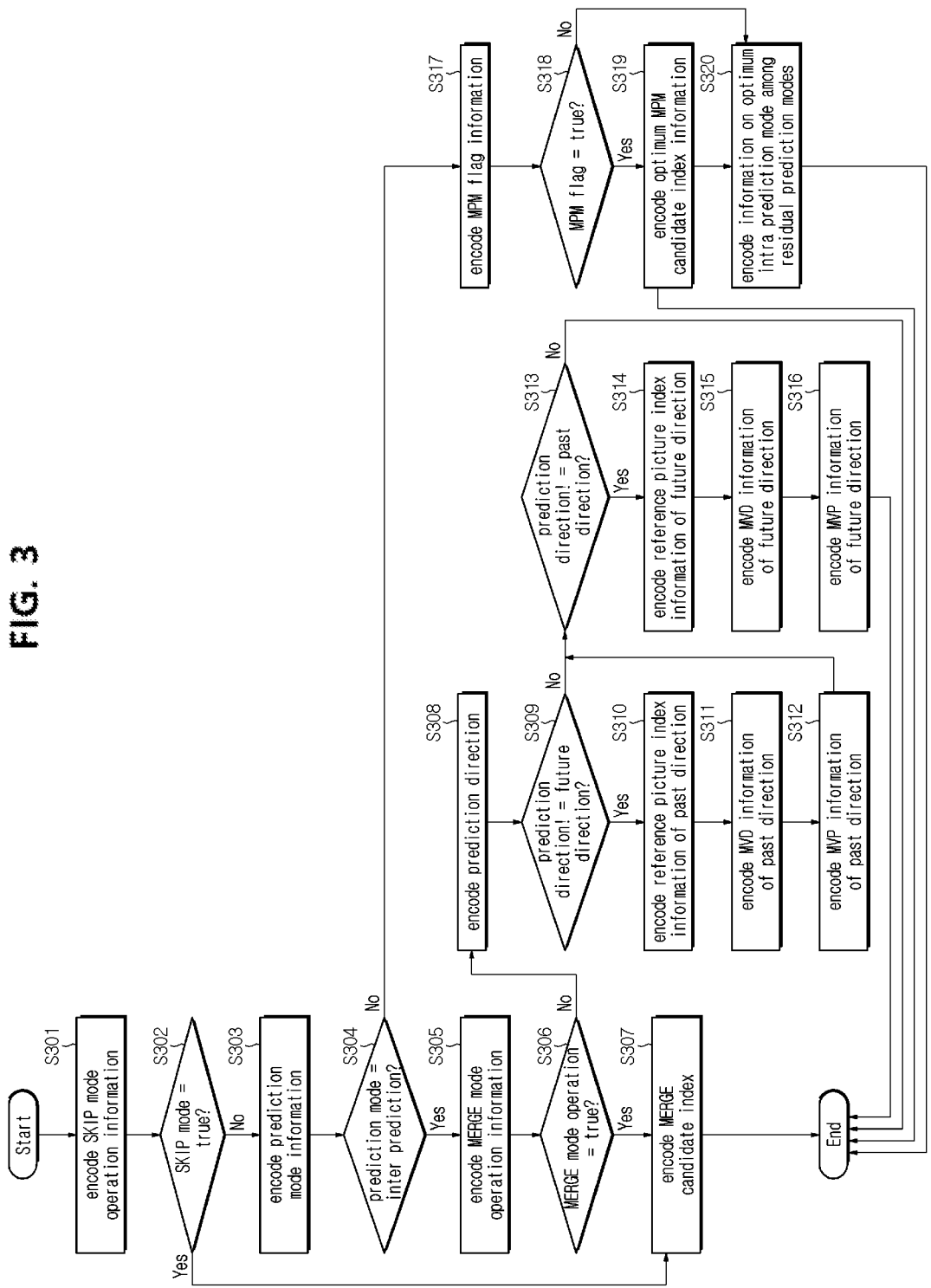
FIG. 3 is a view for describing an embodiment of encoding encoding information in an image encoding apparatus.

FIG. 3 is a view for describing an embodiment of encoding encoding information in an image encoding apparatus.

In the step S301, operation information of a skip mode is encoded. Prediction of a current block in a skip mode uses a merge mode is used. In a decoding apparatus, a prediction block of a current block is used as a reconstructed block. In the step S302 of inter prediction, it is determined whether or not a skip operates. When a skip mode operates (Yes) in the step S302, merge candidate index information for the skip mode is encoded in the step 307, and then this flowchart ends. When a skip mode does not operate (No) in the step S302, a prediction mode is encoded in the step S303. In the step S304, it is determined whether a prediction mode is an inter prediction mode or an intra prediction mode. When a prediction mode is an inter prediction mode (Yes) in the step S304, operation information of a merge mode is encoded in the step S305. In the step S306, it is determined whether or not a merge mode operates. When a merge mode operates (Yes) in the step S306, merge candidate index information for the merge mode is encoded in the step 307, and then this flowchart ends. When a merge mode does not operate (No) in the step S306, a prediction direction is encoded in the step S308. Herein, the prediction direction may be one of the past direction, the future direction, and both directions. In the step S309, it is determined whether or not the prediction direction is the future direction. When the prediction direction is not the future direction (Yes) in the step S309, reference picture index information in the past direction is encoded in the step S310. In the step S311, motion vector difference (MVD) information in the past direction is encoded. In the step S312, motion vector predictor (MVP) information in the past direction is encoded. When the prediction direction is the future direction or bidirectional (No) in the step S309 or when the step S312 ends, whether or not the prediction direction is the past direction is determined in the step S313. When the prediction direction is not the past direction (Yes) in the step S313, reference picture index information in the future direction is encoded in the step S314. In the step S315, MVD information in the future direction is encoded. After MVP information in the future direction is encoded in the step S316, this flowchart ends. Encoding of information performed from the step S305 to the step S316 may be referred to as inter prediction mode information encoding.

When a prediction mode is an intra prediction mode (No) in the step S304, operation information of a most probable mode (MPM) is encoded in the step S317. MPM refers to a method of transmitting MPM candidate intra prediction mode index information after constructing an MPM candidate intra prediction mode by using a reconstructed intra prediction mode around a current block, when an optimum intra prediction mode of the current block determined in an image encoding apparatus exists in the MPM candidate intra prediction mode. In the step S318, it is determined whether or not an MPM operates. When there is a same mode as a prediction mode of a current block among prediction modes of a reconstructed block around the current block, an MPM is a mode for encoding index information. When an MPM operation is true in the step S318 (Yes), index information of an MPM candidate intra prediction mode is encoded in the step S319. When an MPM operation is false in the step S318 (No), optimum intra prediction mode information of luma is encoded among remaining intra prediction modes except an MPM candidate intra prediction mode in the step S320.

After the step S319 and the step S320 end, optimum intra prediction mode information of chroma is encoded and then this flowchart may end. Herein, a module performing the steps S308 to S316 may be referred to as a motion information encoding unit. In addition, a module performing the steps S317 to S320 may be referred to as a luma intra prediction mode encoding unit.

Figure 4:
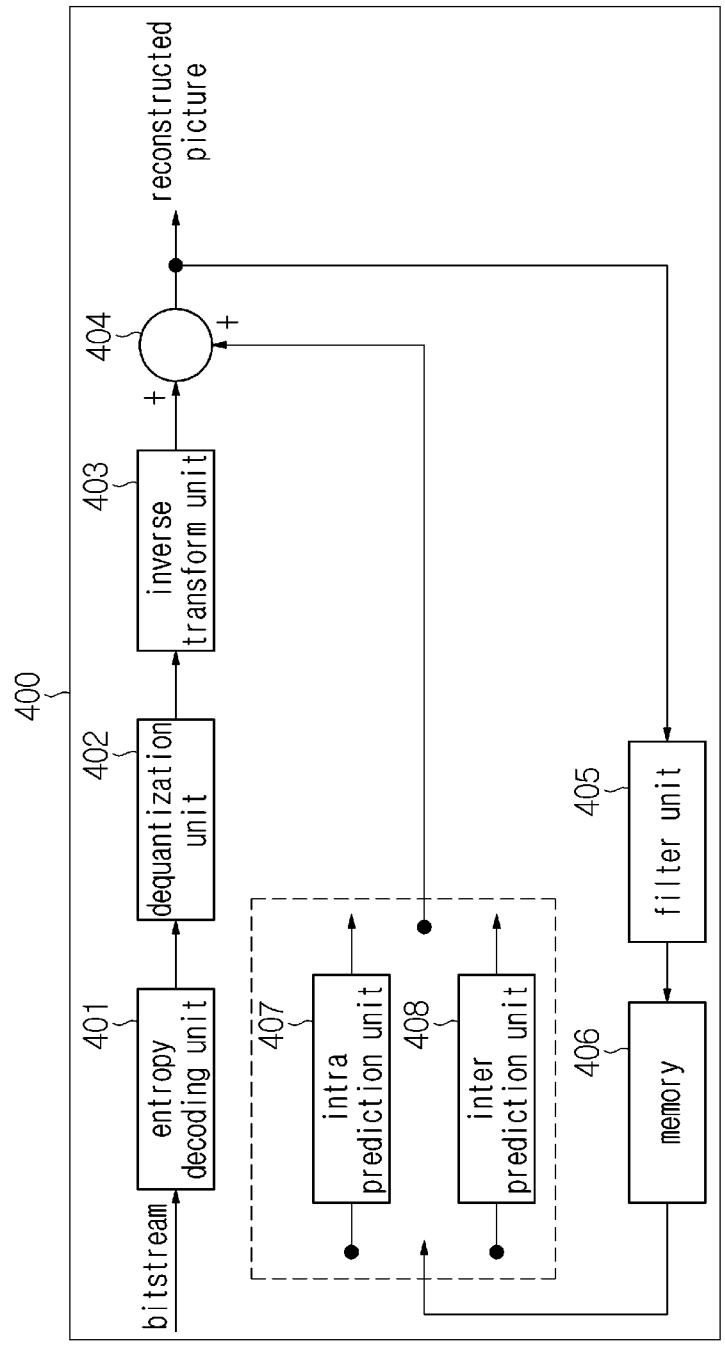
FIG. 4 is a view illustrating a configuration of an image decoding apparatus.

FIG. 4 is a view illustrating a configuration of an image decoding apparatus 400.

The image decoding apparatus 400 may include an entropy decoding unit 401, a dequantization 402, an inverse transform unit 403, an adder 404, a filter unit 405, a memory 406, and prediction units 407 and 408.

When an image bitstream generated by the image encoding apparatus 100 is input into the image decoding apparatus 200, the input bitstream may be decoded according to a reverse process to a process performed by the image encoding apparatus 100.

The entropy decoding unit 401 may perform entropy decoding in a reverse process to the entropy encoding performed in the entropy encoding unit 407 of the image encoding apparatus 100. For example, various methods like exponential Golomb, context-adaptive variable length coding (CAVLC) and context-adaptive binary arithmetic coding (CABAC) maybe applied in response to a method implemented in an image encoder. The entropy decoding unit 401 may decode the above-described syntax elements, that is, Last_sig, Coded_sub_blk_flag, Sig_coeff_flag, Abs_greater1_flag, Abs_greater2_flag, Sign_flag, and remaining_coeff. In addition, the entropy decoding unit 401 may decode information associated with intra prediction and inter prediction that are performed in the image encoding apparatus 100.

The dequantization unit 402 generates a transform block by performing dequantization for a quantized transform block. It actually operates in the same manner as the performed dequantization unit 108 of FIG. 1.

The inverse transform unit 403 generates a residual block by performing inverse transform for a transform block. Herein, a transform method may be determined based on information on a prediction method (inter prediction or intra prediction), a block size and/or shape and an intra prediction mode. The inverse transform unit 403 actually operates in the same manner as the performed inverse transform unit 109 of FIG. 1.

The adder 404 generates a reconstructed block by adding a prediction block, which is generated by the intra prediction unit 407 or the inter prediction unit 408, and a residual block generated by the inverse transform unit 403. The adder 404 actually operates in the same manner as the adder 110 of FIG. 1.

The filter unit 405 reduces various kinds of noises occurring to reconstructed blocks.

The filter unit 405 may include a deblocking filter, an offset correction unit, and an ALF.

Information on whether or not the image encoding apparatus applies a deblocking filter to a corresponding block or picture may be provided, and when the deblocking is applied, information on whether it was a strong filter or a weak filter may be provided. In a deblocking filter of the image decoding apparatus 400, information on a deblocking filter provided in the image encoding apparatus 100 maybe provided. Deblocking filtering for a corresponding block may be performed in the image decoding apparatus 400.

An offset correction unit may perform offset correction for a reconstructed image based on information on an offset value and a type of offset correction that is applied to an image in encoding.

ALF may be applied to a coding unit based on information on whether or not ALF is applied and information on ALF coefficient that are provided by the image encoding apparatus 100. Such ALF information may be provided by being included in a specific parameter set. The filter unit 205 actually operates in the same manner as the filter unit 111 of FIG. 1.

The memory 406 stores a reconstructed block that is generated by the adder 404. It actually operates in the same manner as the performed memory 112 of FIG. 1.

Figure 5:
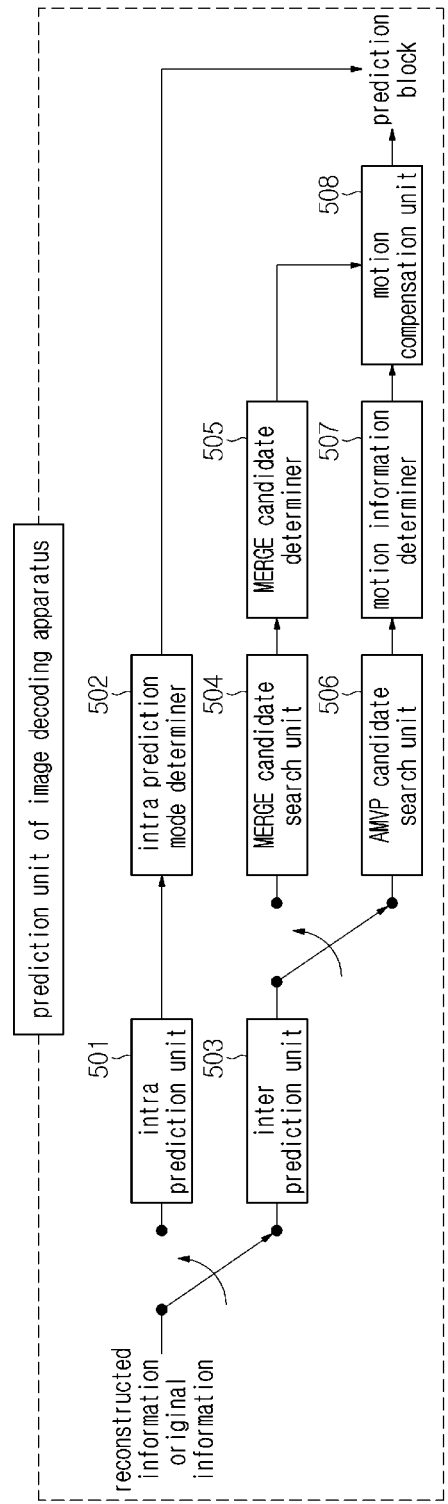
FIG. 5 is a view illustrating a configuration of a prediction unit of an image decoding apparatus.

FIG. 5 is a view illustrating a configuration of a prediction unit of an image decoding apparatus.

An intra prediction unit 501 may generate a reference pixel, and an intra prediction mode determiner 502 may determine an intra prediction mode based on signaled information. A prediction block is generated based on the generated reference pixel and the intra prediction mode. An image decoding apparatus does not perform a prediction mode determination process that is performed by an image encoding apparatus.

An inter prediction unit 503 does not perform the process of determining an optimum prediction mode in FIG. 2. However, it is actually the same as an inter prediction unit of an image encoding apparatus in the process of decoding a prediction mode based on signaled information and generating a prediction block based on the prediction mode.

Figure 6:
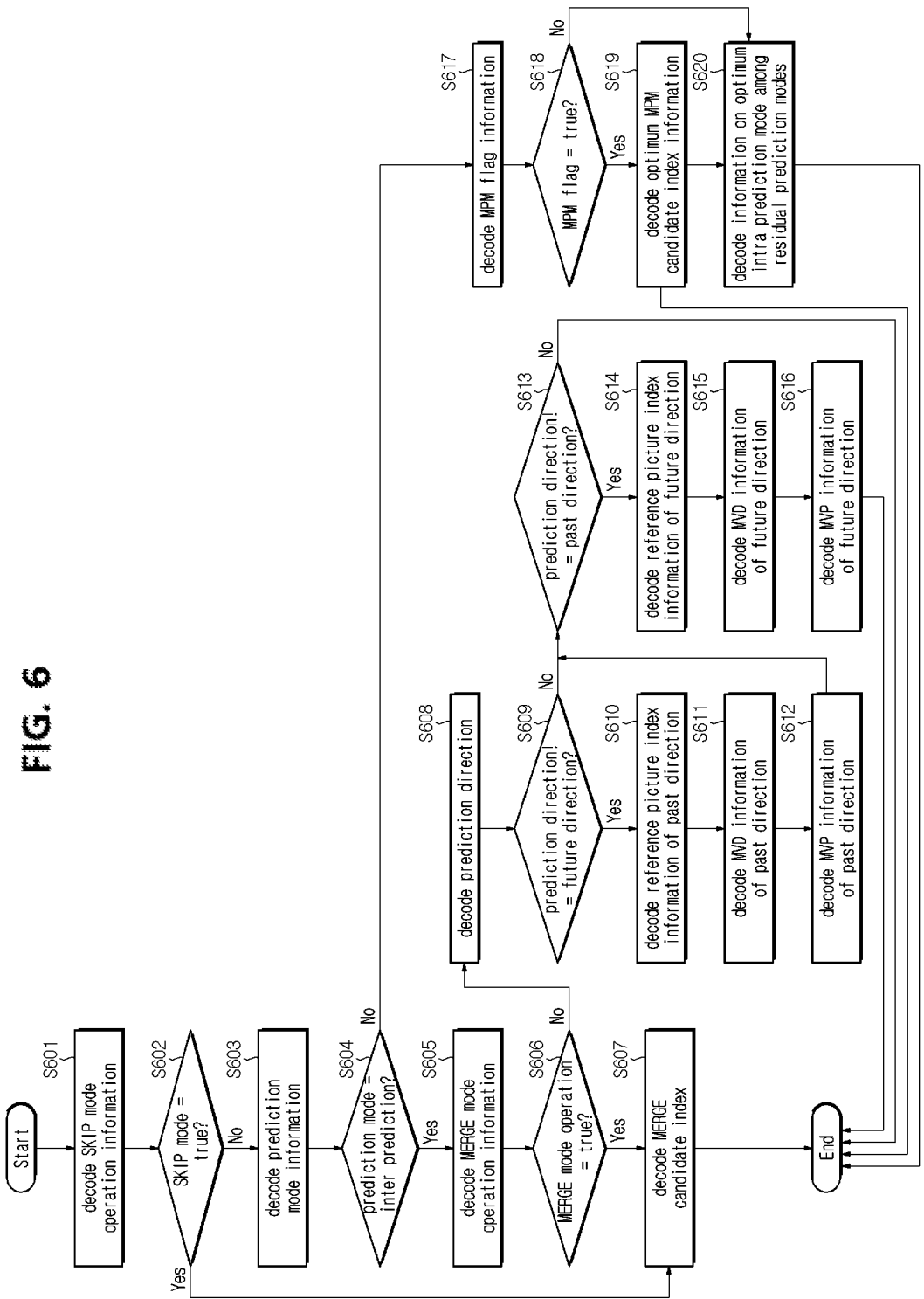
FIG. 6 is a view for describing an embodiment of decoding encoding information in an image decoding apparatus.

FIG. 6 is a view for describing an embodiment of decoding encoding information in an image decoding apparatus.

In the step S601, operation information of a skip mode is decoded. In the step S602, it is determined whether or not a skip mode operates. When a skip mode operates (Yes) in the step S602, merge candidate index information for the skip mode is decoded in the step 607, and then this flowchart ends. When a skip mode does not operate (No) in the step S602, a prediction mode is decoded in the step S603. In the step S604, it is determined whether a prediction mode is an inter prediction mode or an intra prediction mode. When a prediction mode is an inter prediction mode (Yes) in the step S604, operation information of a merge mode is decoded in the step S605. In the step S606, it is determined whether or not a merge mode operates. When a merge mode operates (Yes) in the step S606, merge candidate index information for the merge mode is decoded in the step 307, and then this flowchart ends. When a merge mode does not operate (No) in the step S606, a prediction direction is decoded in the step S608. Herein, the prediction direction may be one of the past direction, the future, and both directions. In the step S609, it is determined whether or not the prediction direction is the future direction. When the prediction direction is not the future direction (Yes) in the step S609, reference picture index information in the past direction is decoded in the step S610. In the step S611, motion vector difference (MVD) information in the past direction is decoded. In the step S612, motion vector predictor (MVP) information in the past direction is decoded. When the prediction direction is the future direction or bidirectional (No) in the step S609 or when the step S612 ends, whether or not the prediction direction is the past direction is determined in the step S613. When the prediction direction is not the past direction (Yes) in the step S613, reference picture index information in the future direction is decoded in the step S614. In the step S615, MVD information in the future direction is decoded. After MVP information in the future direction is decoded in the step S616, this flowchart ends. When a prediction mode is an intra prediction mode (No) in the step S604, operation information of an MPM is decoded in the step S617. In the step S618, it is determined whether or not an MPM operates. When an MPM operation is true in the step S618 (Yes), index information of an MPM candidate intra prediction mode is decoded in the step S619. When an MPM operation is false in the step S618 (No), optimum intra prediction mode information of luma is decoded among remaining intra prediction modes except an MPM candidate intra prediction mode in the step S620. After the step S619 and the step S620 end, optimum intra prediction mode information of chroma is decoded and then this flowchart may end.

Embodiment 1

Figure 7:
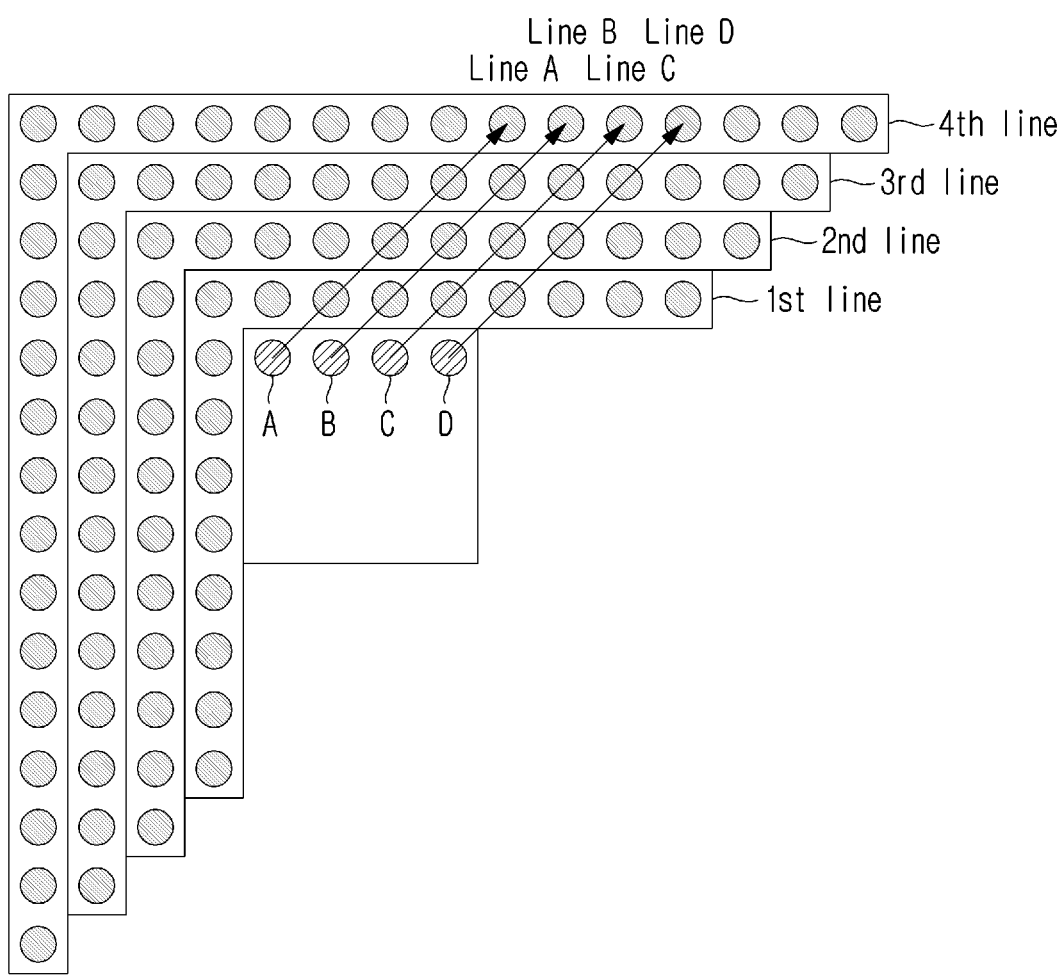
FIG. 7 is a view for describing an embodiment of intra prediction using a plurality of reference pixel lines.

FIG. 7 is a view for describing an embodiment of intra prediction using a plurality of reference pixel lines.

In the example illustrated in FIG. 7, the current block to be encoded has a 4×4 size, and the intra prediction mode is an upper-right diagonal mode.

Figure 8:
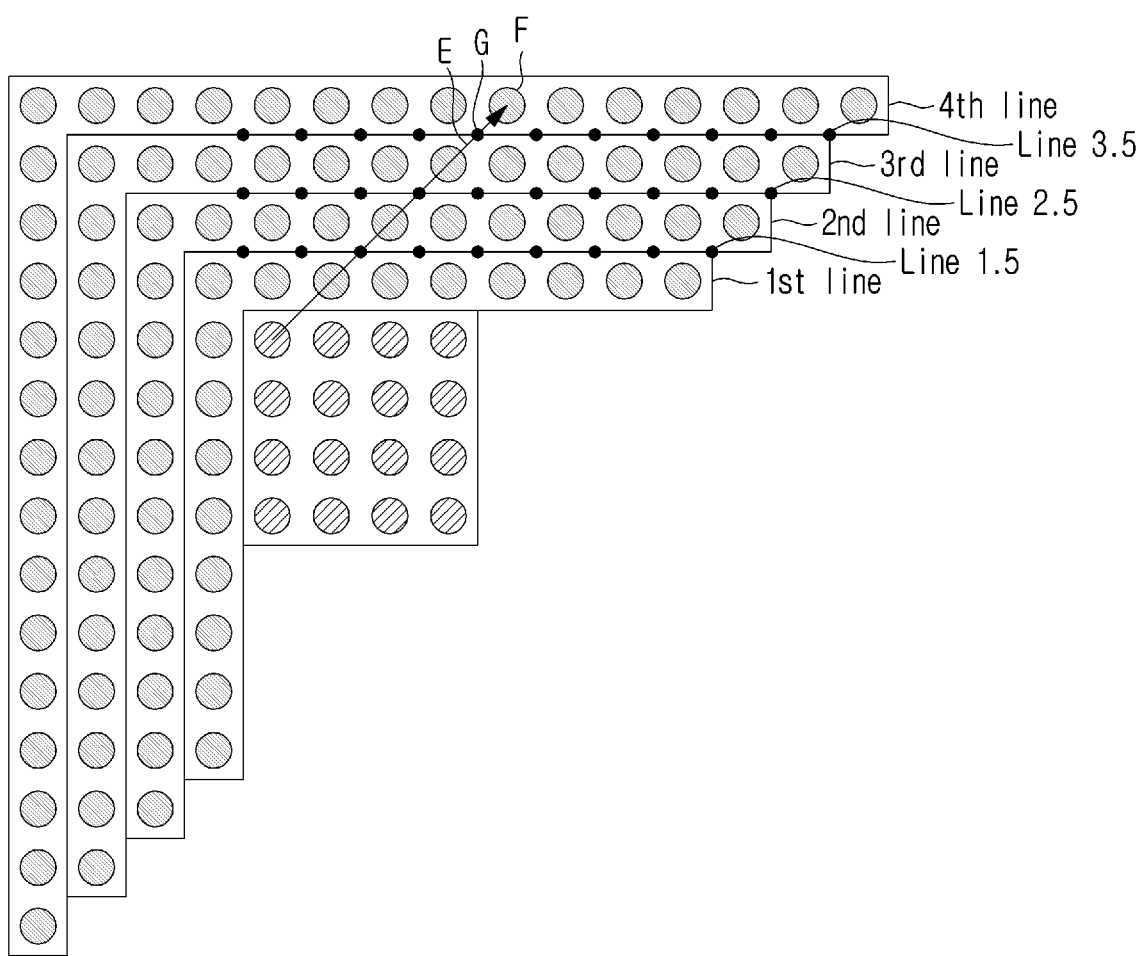
FIG. 8 is a view for describing another embodiment of intra prediction using a plurality of reference pixel lines.

FIG. 8 is a view for describing another embodiment of intra prediction using a plurality of reference pixel lines.

Figure 9:
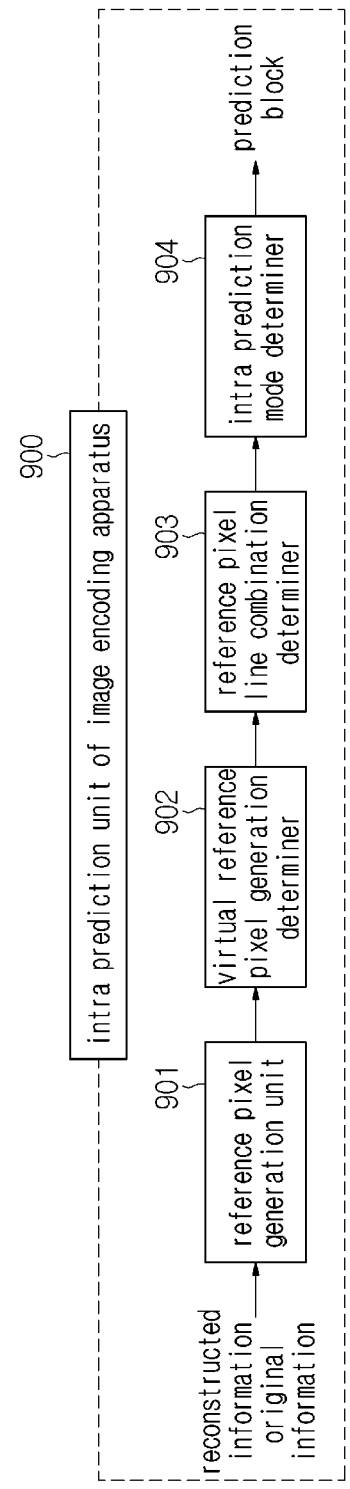
FIG. 9 is a view illustrating an intra prediction unit of an image encoding apparatus using one or more reference pixel lines.

FIG. 9 is a view illustrating an intra prediction unit of an image encoding apparatus using one or more reference pixel lines.

Hereinafter, the intra prediction unit of FIG. 9 will be described with reference to FIG. 7 and FIG. 8. When intra prediction is selected as a prediction mode of a current block, a reference pixel is generated and filtering is performed for each reference pixel line in a reference pixel generation unit 901. The reference pixel generation unit 901 may perform the same process as the intra prediction unit 201 of FIG. 2.

Next, a virtual reference pixel generation determiner 902 determines whether or not a virtual reference pixel line is used and a position of generating the virtual reference pixel line. According to a prediction direction, a virtual reference pixel line is generated between integer reference pixel lines and is used as a reference pixel. One or more virtual reference pixel lines may be generated between integer position reference pixel lines. Herein, areal number position may be a position equidistant from two integer position reference pixel lines or a position close to an integer position reference pixel line that is determined to be optimal. Virtual reference pixel line information may be uniformly used as a preset value of an encoding/decoding apparatus or be transmitted in an upper header. The upper header refers to upper header information including block information such as a video parameter stage, a sequence parameter stage, a picture parameter stage, and a slice stage. Alternatively, virtual reference pixel line information that may be generated in each block may be transmitted.

In FIG. 8, the reference pixel line information 0, the reference pixel line information 1, the reference pixel line information 2 and the reference pixel line information 3 may mean a first line, a second line, a third line and a fourth line respectively. As an example method of generating a virtual reference pixel line, a method of generating line 3.5 that is a real number reference pixel line between the third line and the fourth line. When a prediction direction passes through the reference pixels E and F, as illustrated in FIG. 8, an average value of E and F pixel values is set as the G pixel value of the line 3.5.

A reference pixel line combination determiner 903 selects the reference pixel line combination K. A reference pixel line combination is a combination that is obtained by composing information on one or more reference pixel line into a single set. In FIG. 7, the reference pixel line information 0, the reference pixel line information 1, the reference pixel line information 2 and the reference pixel line information 3 mean a first line, a second line, a third line and a fourth line respectively. K is an index of a reference pixel line combination, and each index may indicate a combination of one or more reference pixel lines. Information on a combination of K reference pixel lines may be uniformly set in an encoding/decoding apparatus or be transmitted in an upper header. Alternatively, reference pixel line information corresponding to the index K may be directly transmitted in each block. For example, it may be set that, when K is 0, only a first line is used as a reference pixel line. It may be set that, when K is 1, a first line and a second line are used as reference pixel lines. It may be set that, when K is 2, a first line and a third line are used as reference pixel lines. A combination indicated by the index K may include not only a reference pixel line but also a virtual reference pixel line.

Hereinafter, a method of generating a prediction block will be described with reference to FIG. 7. In this example, four reference pixel lines are used by K. Four reference pixel lines may be used to obtain the pixel values of the pixel A, the pixel B, the pixel C and the pixel D in a prediction block. Line A, Line B, Line C and Line D represent the prediction directions of the pixel A, the pixel B, the pixel C and the pixel D respectively. For example, an average of reference pixel values where each of Line A, Line B, Line C and Line D passes through may be used as a prediction value of each pixel. Alternatively, a prediction value of a pixel may be used by applying a weight to each reference pixel line. For example, a weight may be applied as in Equation (1) below.

$$P = \alpha \cdot P1 - \beta \cdot P2 \qquad \text{Equation (1)}$$

In Equation (1), P represents a prediction pixel value with a weight applied to it, and P1 and P2 represent available reference pixels. In addition, α and β are weight information. For example, as a reference pixel line is closer to a current block, a higher weight may be applied. A weight applied to each reference pixel line may be uniformly set in an encoding/decoding apparatus or be transmitted in an upper header. Alternatively, weight information to be applied may be transmitted for each block.

An intra prediction mode determiner 904 performs the same process as the intra prediction mode search unit 202 of FIG. 2. In every process in the intra prediction unit 900 of an image encoding apparatus, costs are compared using RD-Cost and then prediction information of one intra prediction mode, that is, an optimum intra prediction mode is selected.

Figure 10:
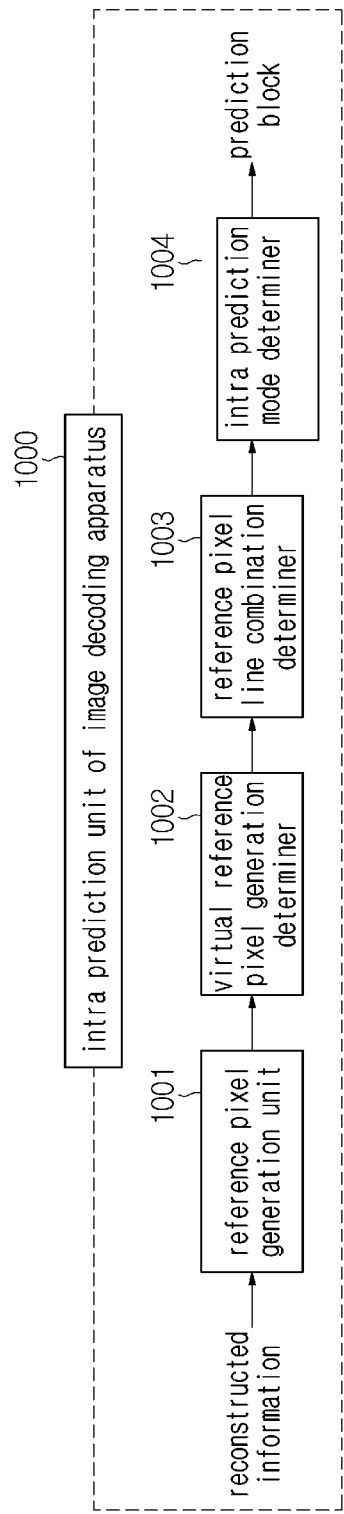
FIG. 10 is a view illustrating an intra prediction unit of an image decoding apparatus using one or more reference pixel lines.

FIG. 10 is a view illustrating an intra prediction unit of an image decoding apparatus using one or more reference pixel lines.

When intra prediction is selected as a current prediction mode, a reference pixel generation unit 1001 may generate a reference pixel and perform filtering. A virtual reference pixel generation determiner 1002 may reconstruct a reference pixel line transmitted from an encoding apparatus, and a reference pixel line combination determiner 1003 may reconstruct a combination index K. An intra prediction mode determiner 1004 may reconstruct an intra prediction mode and generate a prediction block by using one or more reconstructed reference pixel lines.

Figure 11:
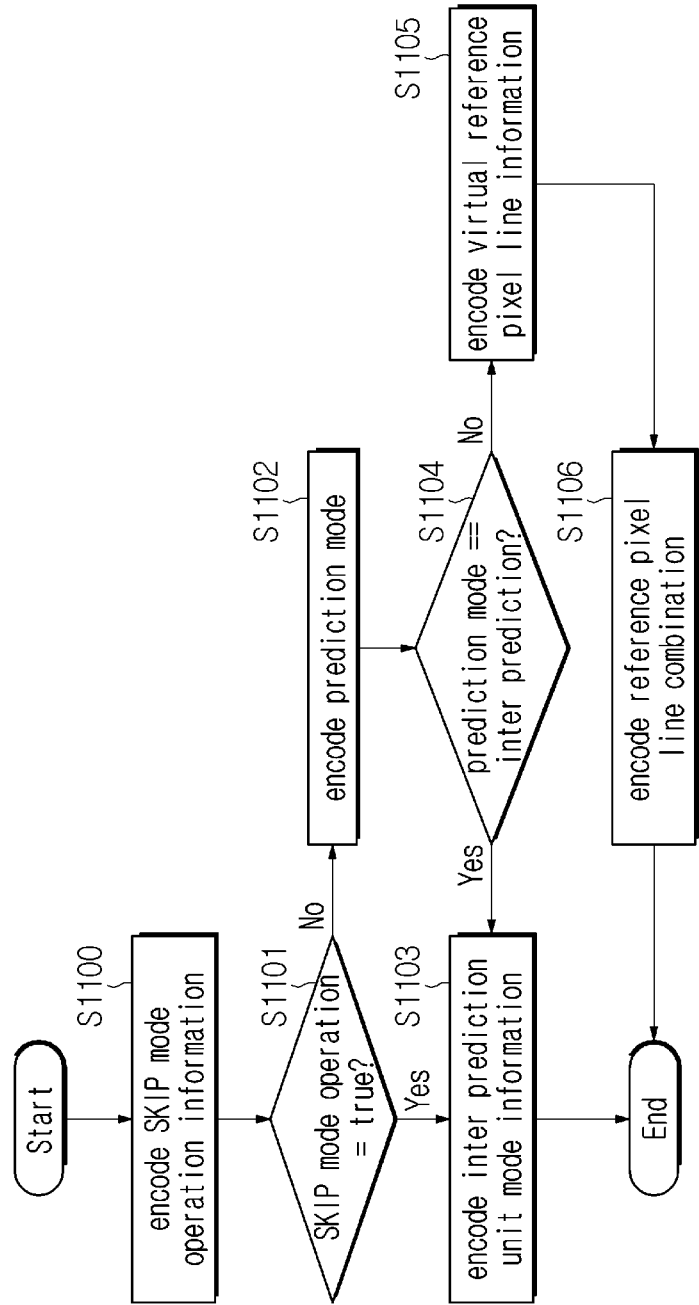
FIG. 11 is a view for describing a method of encoding prediction mode information according to an embodiment of the present disclosure.

FIG. 11 is a view for describing a method of encoding prediction mode information according to an embodiment of the present disclosure.

FIG. 11 adds encoding of virtual reference pixel line information (S1105) and encoding of reference pixel line combination (S1106) to the embodiment that is described with reference to FIG. 3. The remaining process except S1105 and S1106 is completely the same as the embodiment of FIG. 3.

Figure 12:
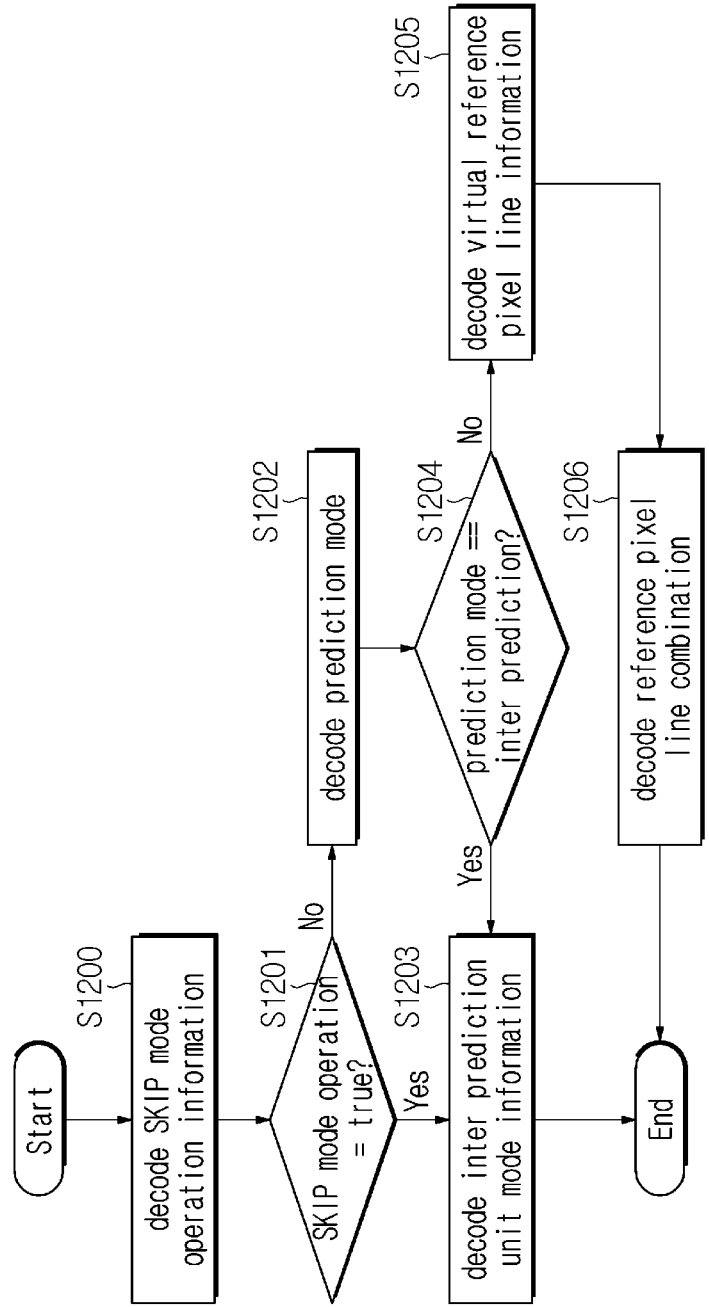
FIG. 12 is a view for describing a method of decoding prediction mode information according to an embodiment of the present disclosure.

FIG. 12 is a view for describing a method of decoding prediction mode information according to an embodiment of the present disclosure.

FIG. 12 adds decoding of virtual reference pixel line information (S1205) and decoding of reference pixel line combination (S1206) to the embodiment that is described with reference to FIG. 6. All the remaining steps of the process except S1205 and S1206 are the same as the embodiment of FIG. 6.

Embodiment 2

Figure 13:
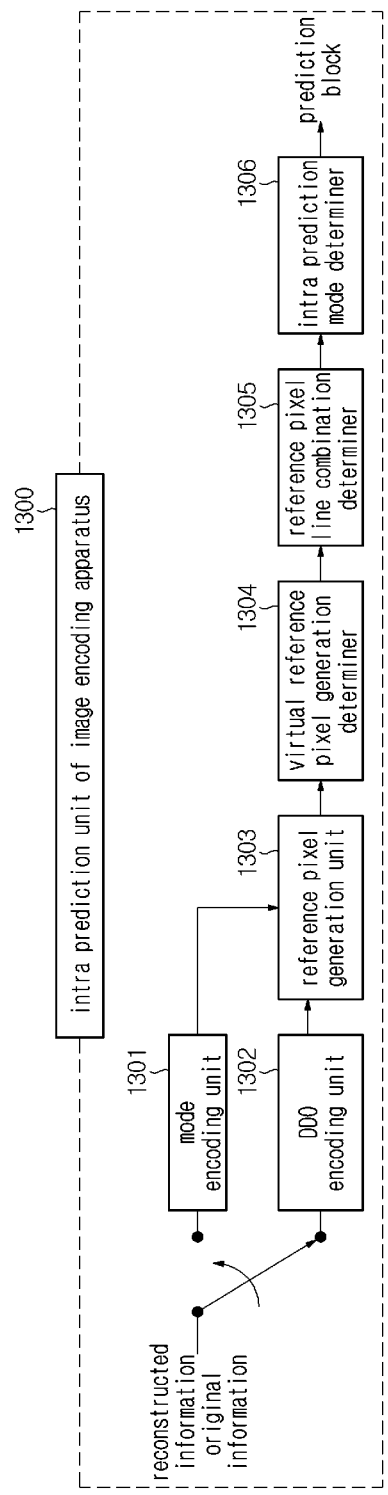
FIG. 13 is a view for describing an intra prediction unit of an image encoding apparatus according to another embodiment of the present disclosure.

FIG. 13 is a view for describing an intra prediction unit of an image encoding apparatus according to another embodiment of the present disclosure.

When intra prediction is selected as a prediction mode of a current block, a method of generating a prediction block becomes different according to whether or not an intra prediction mode is transmitted. Intra prediction information may be information indicating whether or not to transmit an intra prediction mode from an encoding apparatus to a decoding apparatus.

When an intra prediction mode is transmitted, a mode encoding unit 1301 is selected and then a prediction block may be generated through a reference pixel generation unit 1303, a virtual reference pixel generation determiner 1304, a reference pixel line combination determiner 1305 and an intra prediction mode determiner 1306. The reference pixel generation unit 1303, the virtual reference pixel generation determiner 1304, the reference pixel line combination determiner 1305 and the intra prediction mode determiner 1306 may correspond to the reference pixel generation unit 901, the virtual reference pixel generation determiner 902, the reference pixel line combination determiner 903 and the intra prediction mode determiner 904 of FIG. 9, respectively.

When no intra prediction mode is transmitted, a decoder-side intra prediction mode derivation (DIMD) encoding unit 1302 is selected and then a prediction block is generated by performing a same process in an encoding apparatus and a decoding apparatus.

When the DIMD encoding unit is selected, a method of determining an optimum prediction mode is described using the example of FIG. 7. In FIG. 7, the reference pixel line information 0, the reference pixel line information 1, the reference pixel line information 2 and the reference pixel line information 3 mean a first line, a second line, a third line and a fourth line respectively. A process of finding an optimum intra prediction mode by using an optimum reference pixel line combination may be implemented by comparing a prediction block, which is generated using a currently selected reference pixel line combination according to each intra prediction mode, and a prediction block, which is generated using a previously selected reference pixel line combination according to each intra prediction mode, and by selecting an intra prediction mode to which the two prediction blocks are closest. An optimum reference pixel line combination may be selected out of K and K−1 through a same method in an encoding/decoding apparatus or be transmitted in an upper header. Alternatively, which one is to be selected between a current reference pixel line combination and a previous reference pixel line combination may be transmitted in each block. For example, in FIG. 7, when the current K means the fourth reference pixel line and K−1 means the third reference pixel line, distortion may be compared between a prediction block, which is generated using K in each intra prediction mode, and a prediction block, which is generated using K−1 in each intra prediction mode, and an intra prediction mode with least distortion may be determined as an optimum intra prediction mode. Herein, SAD, SSE, and SAID may be used to compare distortion.

Figure 14:
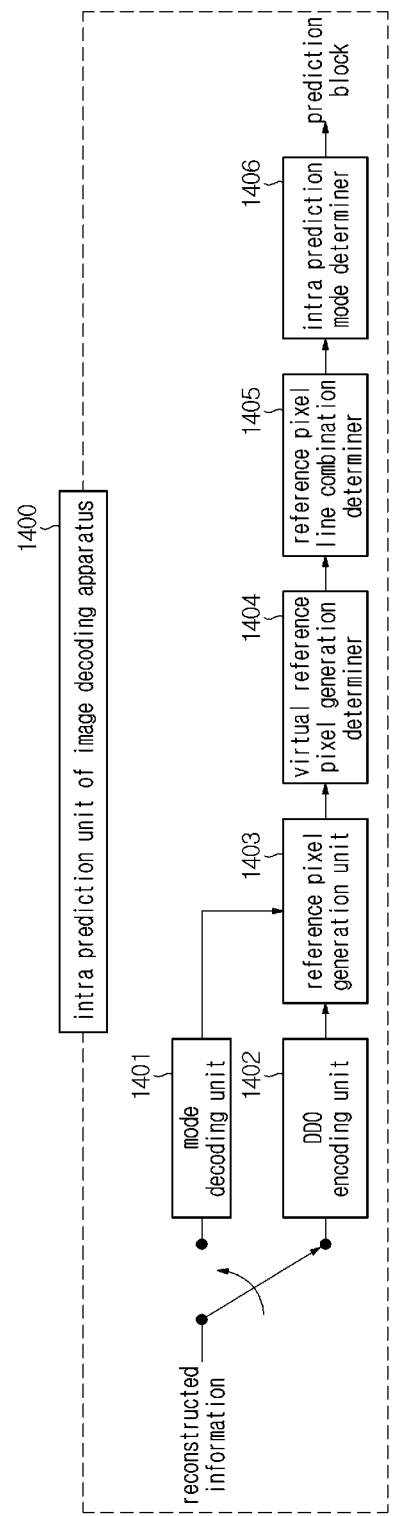
FIG. 14 is a view for describing an intra prediction unit of an image decoding apparatus according to another embodiment of the present disclosure.

FIG. 14 is a view for describing an intra prediction unit of an image decoding apparatus according to another embodiment of the present disclosure.

When intra prediction is selected as a current prediction mode, a method of generating a prediction block becomes different according to intra prediction information.

When an intra prediction mode is transmitted from an encoding apparatus to a decoding apparatus, a mode decoding unit 1401 is selected and then a prediction block may be generated through a reference pixel generation unit 1403, a virtual reference pixel generation determiner 1404, a reference pixel line combination determiner 1405 and an intra prediction mode determiner 1406. The reference pixel generation unit 1403, the virtual reference pixel generation determiner 1404, the reference pixel line combination determiner 1405 and the intra prediction mode determiner 1406 may correspond to the reference pixel generation unit 1001, the virtual reference pixel generation determiner 1002, the reference pixel line combination determiner 1003 and the intra prediction mode determiner 1004 of FIG. 10, respectively.

When an intra prediction mode is not transmitted from an encoding apparatus to a decoding apparatus, a DIMD decoding unit 1402 is selected, and a subsequent process may be the same as the process in the encoding apparatus that is described with reference to FIG. 13.

Figure 15:
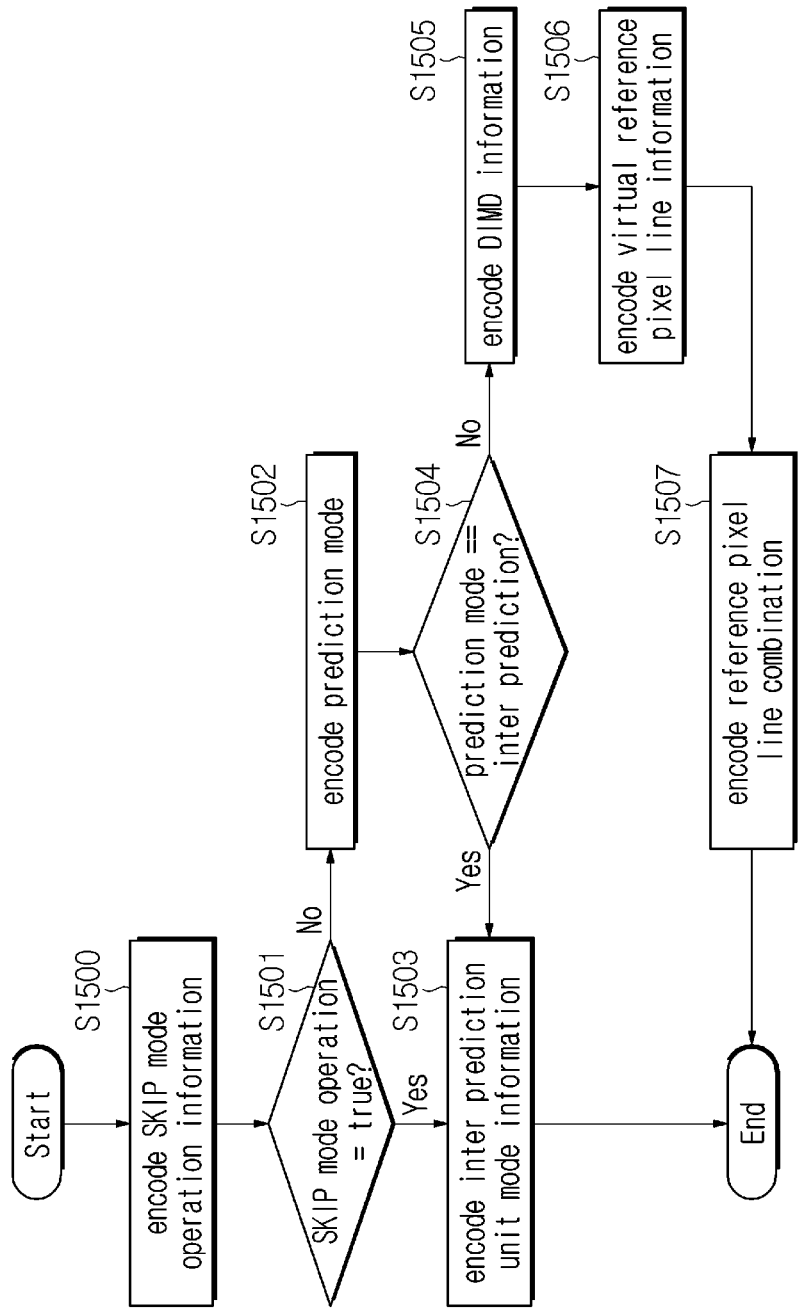
FIG. 15 is a view for describing a method of encoding prediction mode information according to an embodiment of the present disclosure.

FIG. 15 is a view for describing a method of encoding prediction mode information according to an embodiment of the present disclosure.

FIG. 15 adds encoding of DIMD information (S1505), encoding of a virtual reference pixel line (S1506) and encoding of a reference pixel line combination (S1507) to the embodiment that is described with reference to FIG. 3. All the remaining steps of the process except the added steps are the same as the embodiment of FIG. 3.

Figure 16:
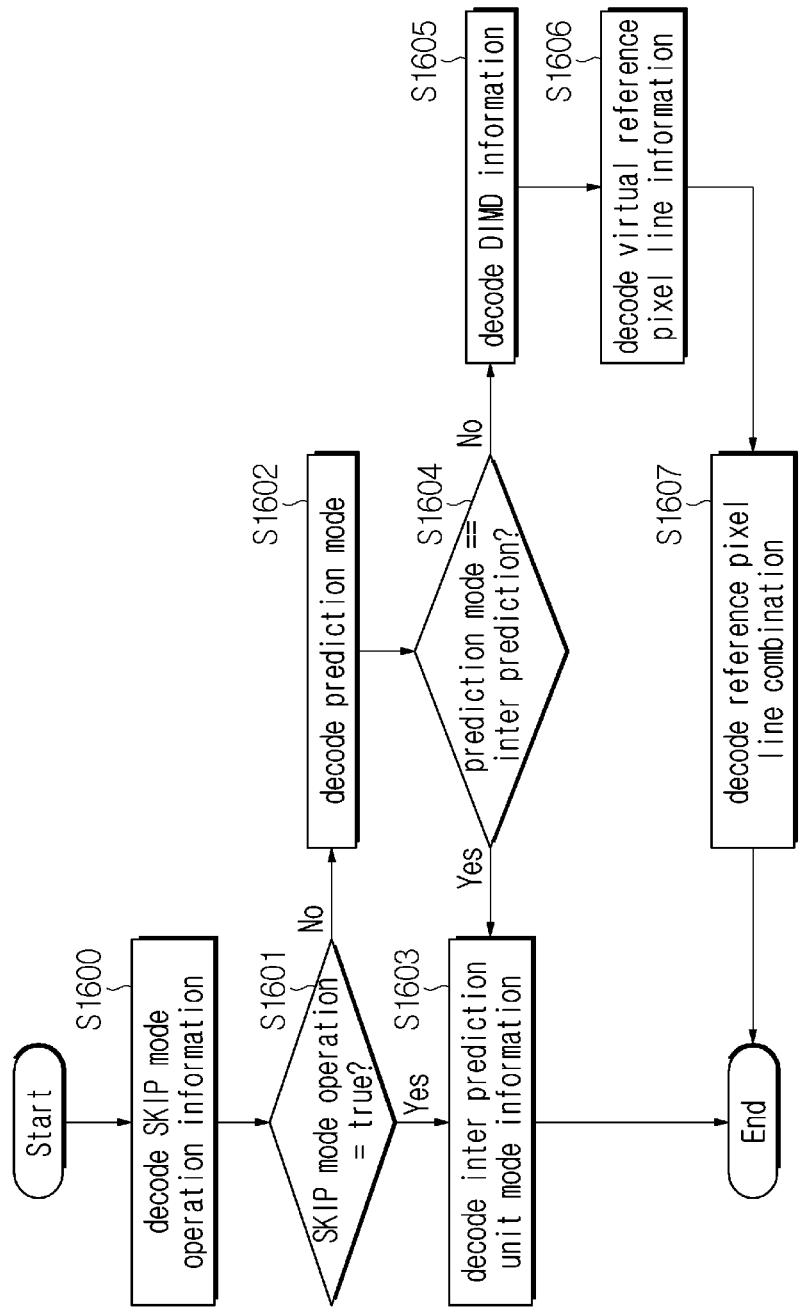
FIG. 16 is a view for describing a method of decoding prediction mode information according to an embodiment of the present disclosure.

FIG. 16 is a view for describing a method of decoding prediction mode information according to an embodiment of the present disclosure.

FIG. 16 adds decoding of DIMD information (S1605), decoding of a virtual reference pixel line (S1606) and decoding of a reference pixel line combination (S1607) to the embodiment that is described with reference to FIG. 4. All the remaining steps of the process except the added steps are the same as the embodiment of FIG. 6.

DIMD information may be information indicating whether or not to transmit an intra prediction mode to a decoding apparatus and whether or not to determine an optimum prediction mode by performing a same process in an encoding/decoding apparatus.

Embodiment 3

Figure 17:
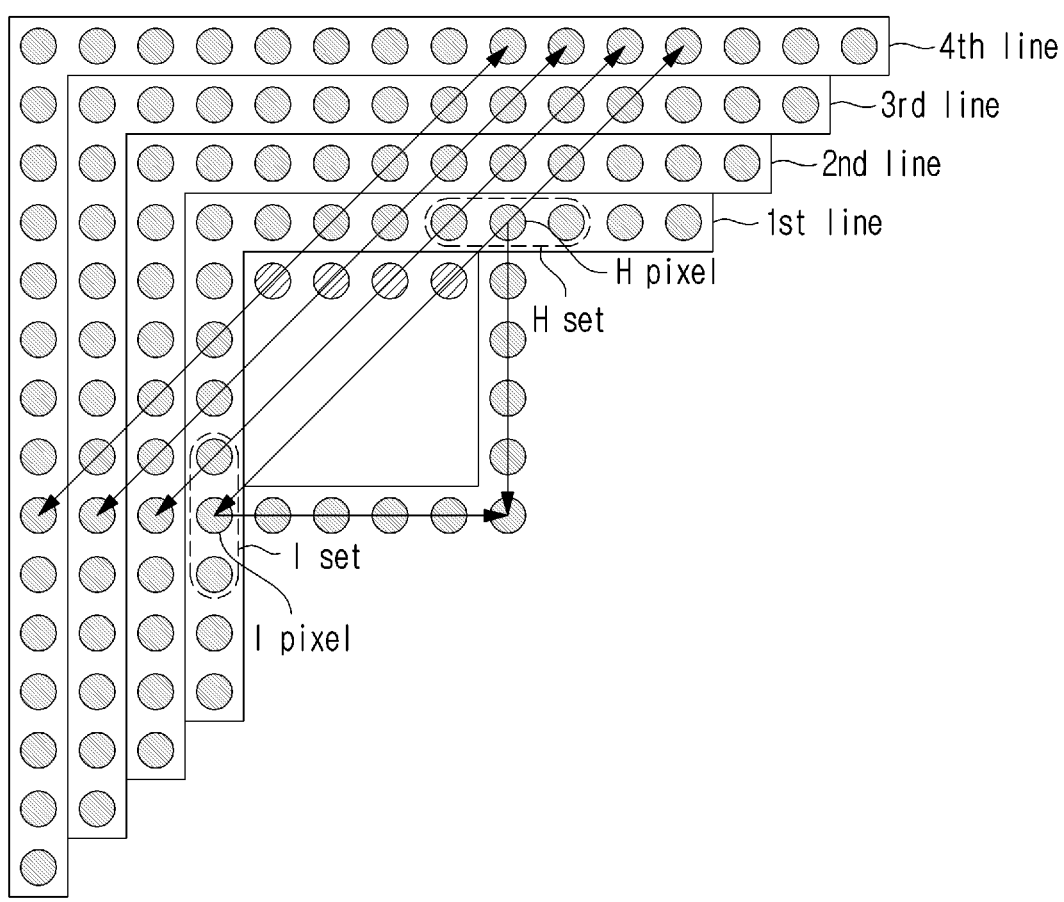
FIG. 17 is a view for describing a method of performing intra prediction according to another embodiment of the present disclosure.

FIG. 17 is a view for describing a method of performing intra prediction according to another embodiment of the present disclosure.

In FIG. 17, the block to be encoded has a 4×4 size, and the intra prediction mode is an upper-right angular mode.

Figure 18:
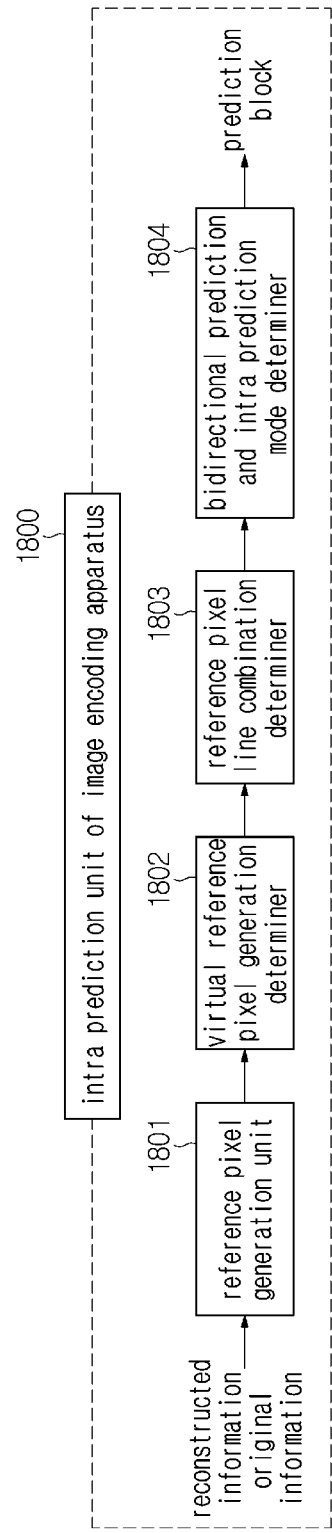
FIG. 18 is a view for describing an intra prediction unit of an image encoding apparatus according to another embodiment of the present disclosure.

FIG. 18 is a view for describing an intra prediction unit of an image encoding apparatus according to another embodiment of the present disclosure.

An intra prediction unit of FIG. 18 may generate a prediction block by using a unidirectional or bidirectional prediction mode.

A bidirectional prediction and intra prediction mode determiner 1804 of the embodiment of FIG. 18 is the addition of bidirectional prediction to the intra prediction mode determiner 904 of the embodiment of FIG. 9. The other configuration of the embodiment of FIG. 18 is the same as the embodiment of FIG. 9.

A method of generating a prediction block according to this embodiment will be described with reference to FIG. 17. According to an intra prediction mode, unidirectional or bidirectional prediction maybe performed. In the case of unidirectional prediction, a prediction block is generated by using a reference pixel line of one direction according to an intra prediction mode. In the case of bidirectional prediction, as illustrated in FIG. 17, a prediction block may be generated by using a weighted sum between a reference pixel selected by unidirectional prediction and a reference pixel selected by using a reference pixel line in the opposite direction to the bidirectional prediction direction. For example, when the unidirectional prediction is right upwards and a first reference pixel line is available, it is possible to select a reference pixel on the first pixel line located to the upper right of a pixel in a current block. In addition, it is possible to select a reference pixel on a first reference pixel line located the lower left, which is the opposite direction to the upper right. A predicted value of a pixel may be derived by weight-summing the selected reference pixels.

A same weight may be applied to each of reference pixels thus selected, or different weight may be applied. For example, according to a distance between a prediction pixel to be coded in a current block and a reference pixel, a height weight may be applied to a closer reference pixel than a remoter reference pixel. Alternatively, in the case of bidirectional prediction, a higher weight may be applied to a reference pixel of unidirectional prediction than a reference pixel of the opposite direction. A weight applied to each reference pixel line may be uniformly set and used in an encoding/decoding apparatus or be transmitted in an upper header. Alternatively, a weight applied to each block may be transmitted and be uniformly used in an encoding/decoding apparatus.

In bidirectional prediction, for a region with no reconstructed reference pixel, a neighboring reference pixel value may be padded or interpolated to be used as a reference pixel. For example, H pixel and I pixel values may be padded and be used as a reference pixel for a region without reference pixel, that is, a right region and a bottom region of a current block. Herein, a portion where the right region and the bottom region overlap may be padded with, for example, an average value of the H pixel and the I pixel.

Alternatively, the padding may be performed with an average value or a weighted average value of the H set and an average value or a weighted average value of the I set. For example, a weight applied to the weighted average value maybe 1:2:1. Alternatively, the padding may be first performed using the weighted average value of the H set and the weighted average value of the I set, and then the padded value may be filtered using the brightness change of the reference pixels of the unidirectional prediction according to the intra prediction mode.

The H set may include H pixel and its adjacent pixels. For example, the H set may include an H pixel and a left adjacent pixel and a right adjacent pixel of the H pixel. Likewise, the I set may include I pixel and its neighboring pixels. For example, the I set may include an I pixel and an upper adjacent pixel and a lower adjacent pixel of the I pixel.

In the example of FIG. 17, for convenience of description, padding for a region in which no pixel is reconstructed in bidirectional prediction has been described for only one reference pixel line. However, the present disclosure is not limited thereto, and padding of a region without reconstructed pixels may be performed on some or all of the plurality of reference pixel lines.

The intra prediction unit of the image encoding apparatus of FIG. 18 may compare RD-Cost in each process to determine optimal prediction information.

Figure 19:
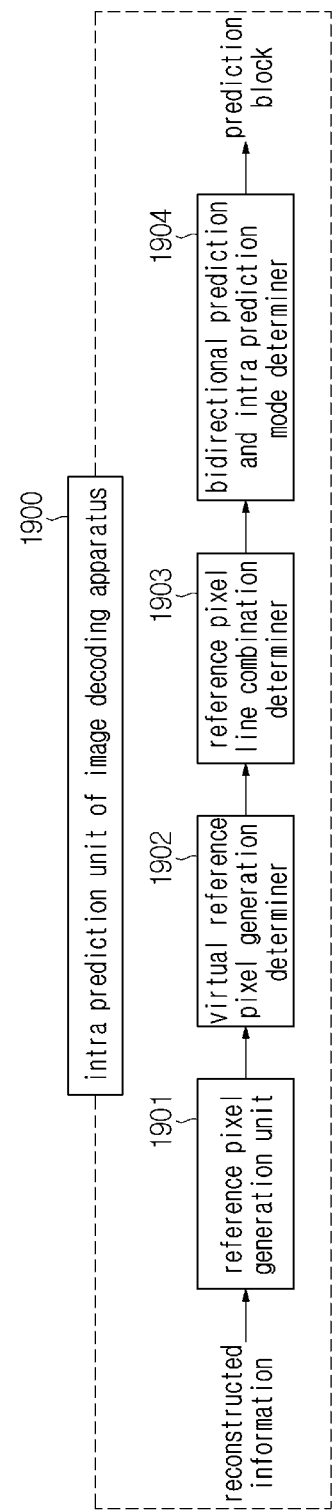
FIG. 19 is a view for describing an intra prediction unit of an image decoding apparatus according to another embodiment of the present disclosure.

FIG. 19 is a view for describing an intra prediction unit of an image decoding apparatus according to another embodiment of the present disclosure.

When intra prediction is selected as a current prediction mode, a reference pixel generation unit 1901 may derive a reference pixel and perform filtering. A virtual reference pixel generation determiner 1902 may determine a virtual reference pixel line based on information transmitted from an encoding apparatus, and a reference pixel line combination determiner 1903 may determine an optimal reference pixel line combination. A bidirectional prediction and intra prediction mode determiner 1904 may determine an intra prediction mode and generate a prediction block based on the intra prediction mode.

Figure 20:
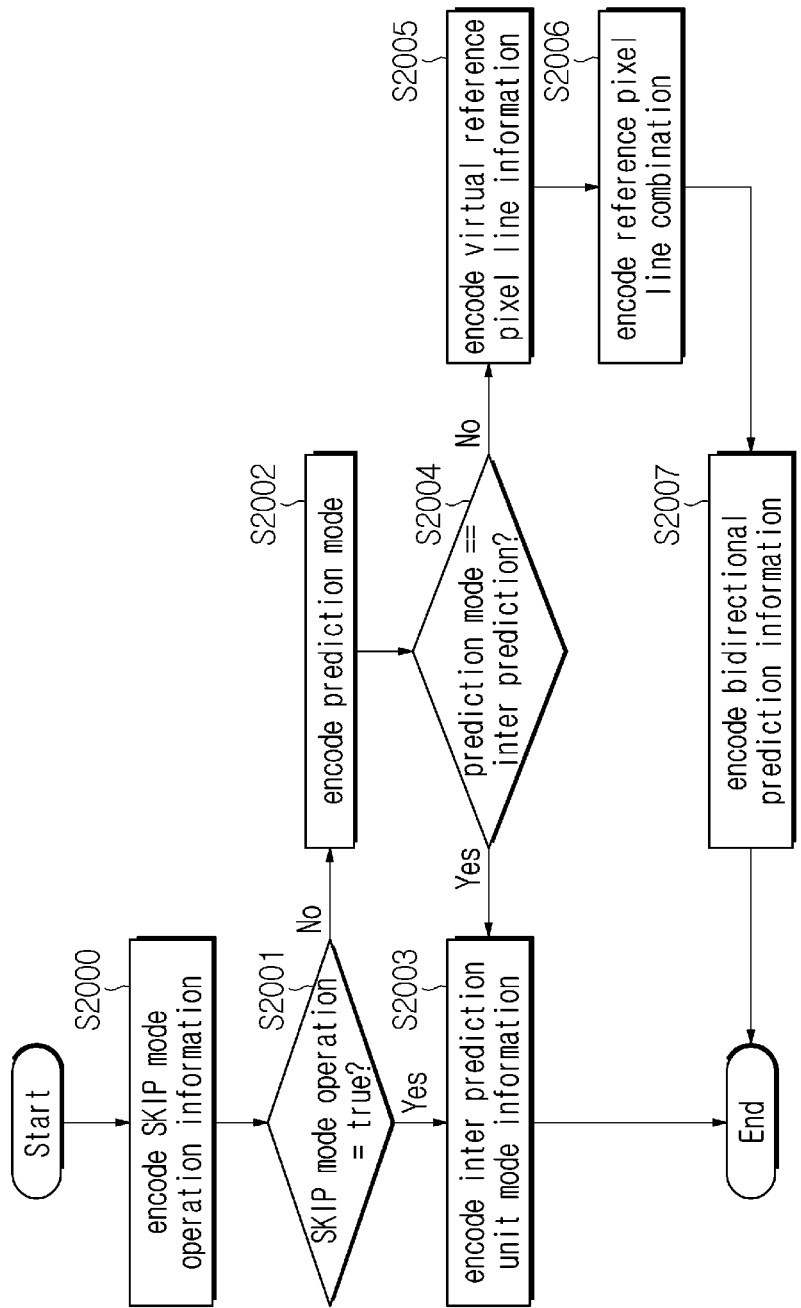
FIG. 20 is a view for describing a method of encoding prediction mode information according to an embodiment of the present disclosure.

FIG. 20 is a view for describing a method of encoding prediction mode information according to an embodiment of the present disclosure.

FIG. 20 adds encoding of virtual reference pixel line information (S2005), encoding of a reference pixel line combination (S2006) and encoding of bidirectional prediction information (S2007) to the embodiment that is described with reference to FIG. 3. All the remaining steps of the process except the added steps are the same as the embodiment of FIG. 3.

Figure 21:
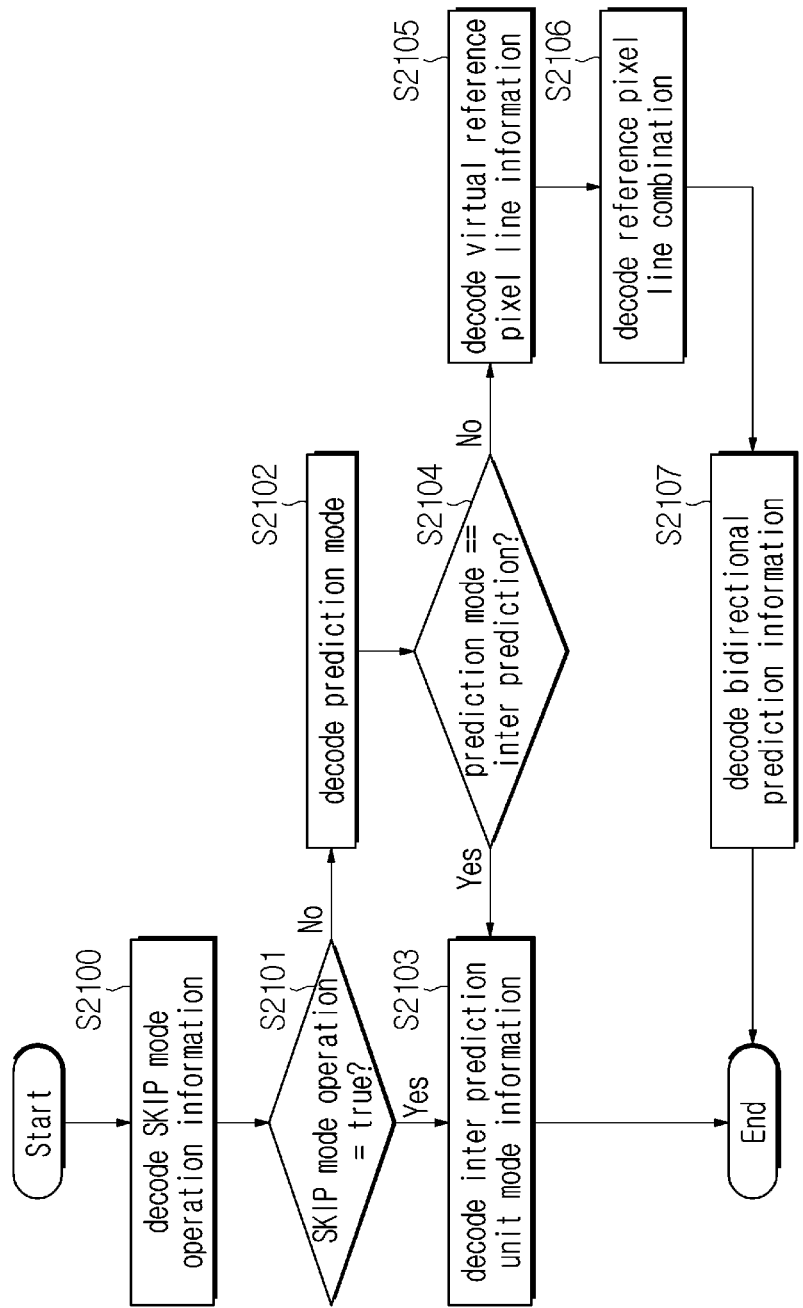
FIG. 21 is a view for describing a method of decoding prediction mode information according to an embodiment of the present disclosure.

FIG. 21 is a view for describing a method of decoding prediction mode information according to an embodiment of the present disclosure.

FIG. 21 adds decoding of virtual reference pixel line information (S2105), decoding of a reference pixel line combination (S2106) and decoding of bidirectional prediction information (S2107) to the embodiment that is described with reference to FIG. 6. All the remaining steps of the process except the added steps are the same as the embodiment of FIG. 6.

Figure 22:
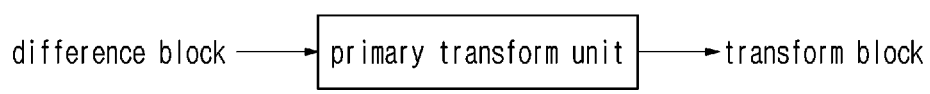
FIG. 22 is a view for describing an operation of a transform unit of an image encoding apparatus.

FIG. 22 is a view for describing an operation of a transform unit of an image encoding apparatus.

A residual block (difference block) is transformed in a primary transform unit to generate a transform block. Herein, DCT, DST, or the like may be used as a transform technique. A same transform technique may be used by being preset in an encoding/decoding apparatus, and transform technique information on the used transform technique may be transmitted in an upper header. Alternatively, transform technique information may be transmitted for each block. The upper header refers to upper header information including block information such as a video parameter stage, a sequence parameter stage, a picture parameter stage, and a slice stage.

The transform technique information may include information on which transform technique is applied to each of the horizontal direction and vertical direction of a block. In addition, the transform technique information may include information on whether or not different transform techniques may be applied to the horizontal direction and vertical direction of a block respectively. The transform technique information may be transmitted for an inter mode and an intra mode respectively.

A transform technique may be determined based on at least one of the size (either width or height or both), shape, aspect ratio, (inter or intra) prediction mode and prediction mode of inter prediction of a current block.

Figure 23:
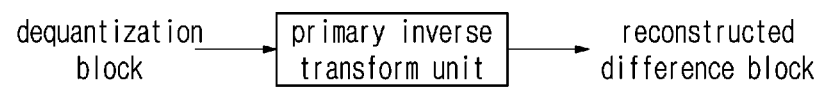
FIG. 23 is a view for describing an operation of an inverse transform unit of an image encoding/decoding apparatus.

FIG. 23 is a view for describing an operation of an inverse transform unit of an image encoding/decoding apparatus.

A dequantized block is inverse transformed in a primary inverse transform unit and thus a reconstructed difference block is generated.

Figure 24:
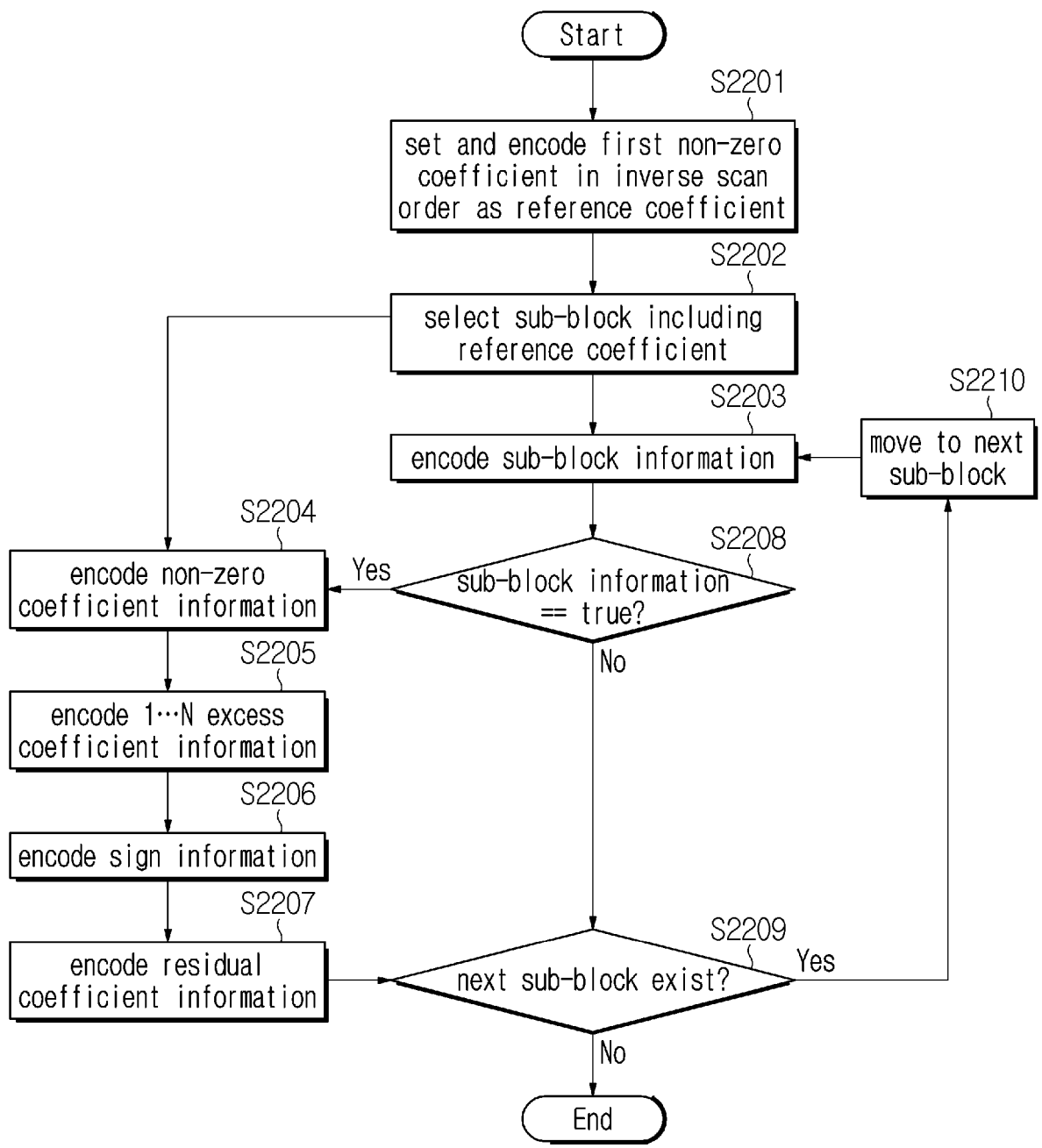
FIG. 24 is a view for describing an embodiment of a method of encoding a transform block.

FIG. 24 is a view for describing an embodiment of a method of encoding a transform block.

The encoding method of a transform block of FIG. 24 may be implemented by the entropy encoding unit 107 of the image encoding apparatus 100.

First, when scanning transform coefficients according to an inverse scan order, a first non-zero coefficient is determined as a reference coefficient, and the position information Last_sig is encoded (S2201).

A sub-block including the reference coefficient is selected (S2202), and transform coefficient information in the sub-block is encoded. When a sub-block does not include the reference coefficient, sub-block information is encoded before encoding a coefficient in a transform block (S2203). The sub-block information Coded_sub_blk_flag is a flag indicating whether or not there is at least one non-zero coefficient in a current sub-block. Next, non-zero coefficient information is encoded (S2204). Herein, the non-zero coefficient information Sig_coeff_flag indicates whether the value of each coefficient existing in a sub-block is 0 or not.

Then, N excess coefficient information is encoded (S2205). Herein, the N excess coefficient information indicates whether or not, for all coefficients present in the sub-block, an absolute value of each coefficient exceeds a value from 1 to N. For N, an arbitrary preset value may be used for encoding and decoding, but it is possible to encode the value of N and thus to use a same value for encoding and decoding. For the number of pieces of N excess coefficient information, any preset value may be used or different values may be used according to a position of a reference coefficient. For example, when N is set to 3, it is encoded, for all coefficients that are determined as non-zero coefficients in the sub-block, whether or not the absolute value of each coefficient is greater than 1. For this, the flag Abs_greater1_flag is used which indicates whether or not the absolute value of a coefficient is greater than 1. Next, only for a coefficient that is determined as a value greater than 1, whether or not it is greater than 2 is encoded. Herein, the flag Abs_greater2_flag is used which indicates whether or not the absolute value of a coefficient is greater than 2. Finally, only for a coefficient that is determined as a value greater than 2, whether or not it is greater than 3 is encoded. Herein, the flag Abs_greater3_flag may be used which indicates whether or not the absolute value of a coefficient is greater than 3.

Next, for each coefficient that is determined as non-zero, sign information indicating whether it is negative or positive is encoded (S2206). Sign_flag may be used as the sign information. In addition, only for a coefficient that is determined to be greater than N, a residual value obtained by subtracting N is defined as residual coefficient information, and the residual value information remaining_coeff of the coefficient is encoded (S2207).

Next, it is confirmed whether or not there is a next sub-block (S2209), and if there is, proceed to the next sub-block (S2210) and sub-block information is encoded (S2203). The corresponding sub-block information Coded_sub_blk_flag is checked (S2208), and when it is determined that the value of Coded_sub_blk_flag is true, Sig_coeff_flag, which is non-zero coefficient information, is encoded. When the value of the corresponding sub-block information Coded_sub_blk_flag is false, it means that there is no coefficient to be encoded in the sub-block, and whether or not a next sub-block exists is checked. Alternatively, after moving to a next sub-block, when the sub-block is a sub-block located at the lowest frequency side, sub-block information may not be encoded and decoded but may be uniformly set to be true in encoding and decoding under the assumption that there is a non-zero coefficient.

Figure 25:
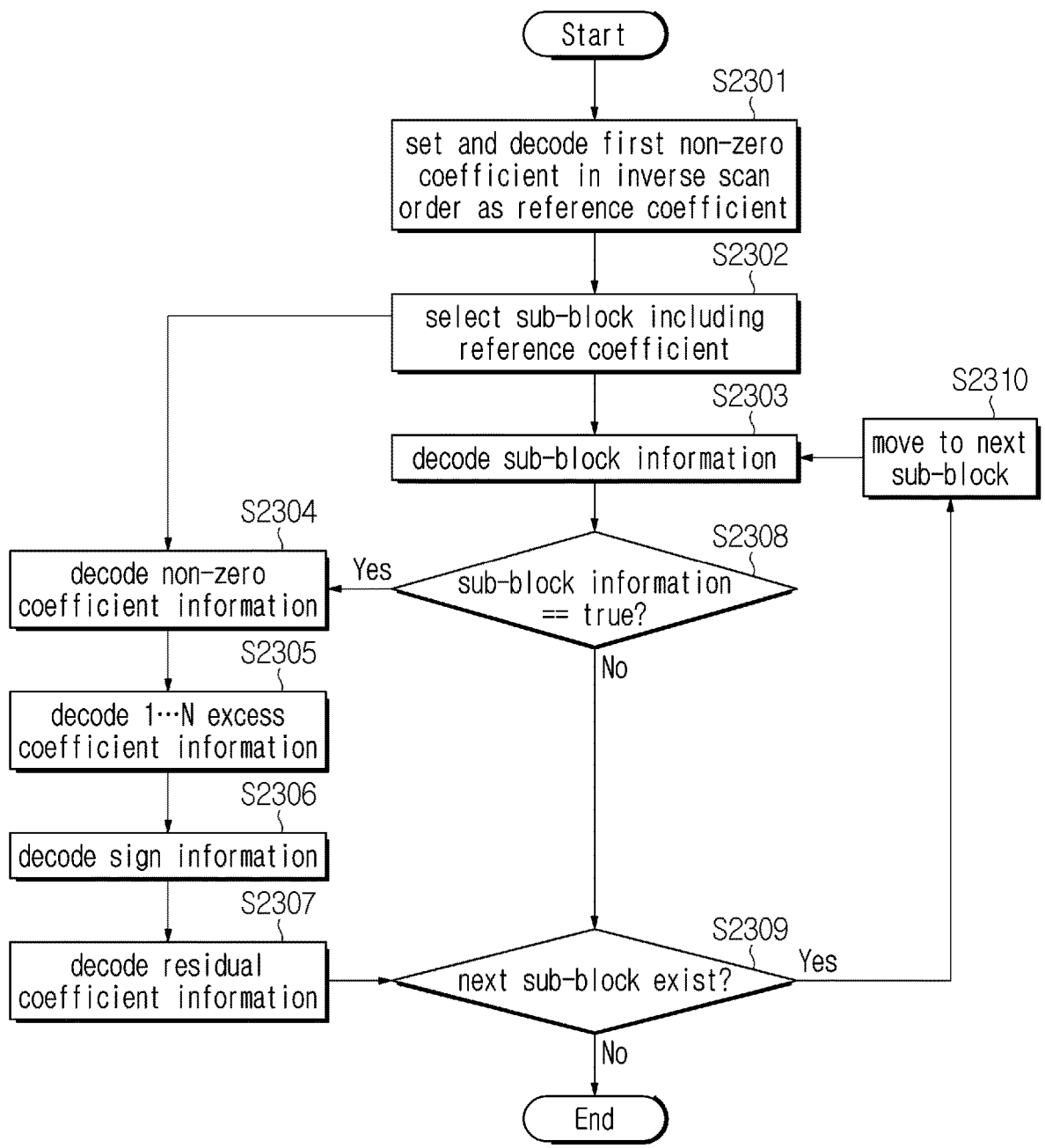
FIG. 25 is a view for describing an embodiment of a method of decoding a transform block.

FIG. 25 is a view for describing an embodiment of a method of decoding a transform block.

The method of decoding a transform block in FIG. 25 corresponds to the method of encoding a transform block in FIG. 24. The method of decoding a transform block of FIG. 25 may be implemented by the entropy decoding unit 401 of the image decoding apparatus 400 of FIG. 4.

Position information Last_sig of a reference coefficient, which is a first non-zero transform coefficient according to an inverse scan order, is decoded (S2301).

A sub-block including the reference coefficient is selected (S2302), and the sub-block information Coded_sub-blk-flag is decoded (S2303). Next, the non-zero coefficient information Sig_coeff_flag is decoded (S2304). Next, N excess coefficient information is decoded (S2305). Herein, the N excess coefficient information may include the above-described Abs_greater1_flag, Abs_greater2_flag and Abs_greater3_flag.

Next, for each coefficient that is determined as non-zero, the sign information Sing-flag of the coefficient is decoded (S2306). In addition, only for a coefficient that is determined to be greater than N, the remaining coefficient information remaining_coeff, which corresponds to a residual value obtained by subtracting N, is decoded (S2307). Next, it is checked whether or not there is a next sub-block (S2309), and if there is, proceed to the next sub-block (S2310) and the sub-block information Coded_sub_blk_flag is decoded (S2303). The corresponding sub-block information Coded_sub_blk_flag is checked (S2308). When it true, the non-zero coefficient information Sig_coeff_flag is decoded. When it is false, it means that there is no coefficient to be decoded in the sub-block, and it is checked whether or not a next sub-block exists.

For encoded information, a context-adaptive binarization arithmetic process is performed through a binarization process. The context-adaptive binarization arithmetic process refers to a process of symbolizing encoded information in a block and applying and encoding the probability of occurrence of symbols differently by means of probability information according to circumstances. In this example, for convenience of description, 0 and 1 are used as symbols, but the number of symbols may be N (N is a natural number equal to or greater than 2).

Probability information refers to the probability of occurrence of 0 and 1 in binarized information. Occurrence probabilities of the two pieces of information may be the same as or different from the previously restored information. Alternatively, there may be M pieces of probability information according to previously restored information. Herein, the M pieces of probability information may be expressed in a probability table form.

Figure 26:
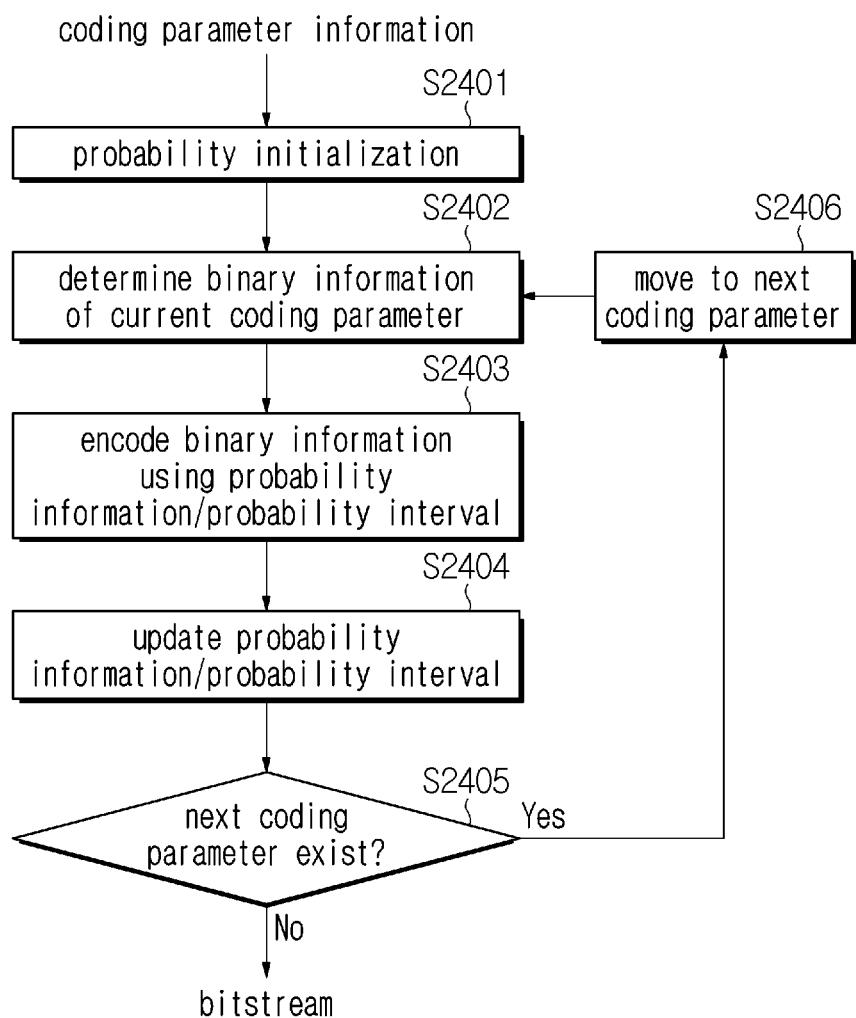
FIG. 26 is a view for describing an embodiment of a context-adaptive binary arithmetic coding method.

FIG. 26 is a view for describing an embodiment of a context-adaptive binary arithmetic coding method.

First, probability initialization is performed (S2401). Probability initialization is a process of dividing binarized information at probability intervals based on a probability set in probability information. However, as for what kind of probability information is to be used, a same condition may be used according to an arbitrary rule that is set in an encoding apparatus or a decoding apparatus, or the probability information may be separately encoded. An initial probability interval may be uniformly determined in an encoding/decoding process according to a preset rule. Alternatively, the initial probability interval may be newly encoded and used. Alternatively, a probability interval and probability information of a coding parameter that is previously used may be brought without probability initialization.

When the binary information of a current coding parameter to be encoded is determined (S2402), the binarized information of the current coding parameter is encoded using the probability interval state up to the previous step of the step S2402 in FIG. 26 and the previous probability information of the same coding parameter (S2403). Next, probability information and probability intervals may be updated (S2404) for binary information to be encoded later. Next, when there is a next piece of coding parameter information to be encoded (S2405), proceed to the next coding parameter information (S2406), and the above-described process is repeated. When the next coding parameter information to be encoded does not exist, this flowchart ends.

Figure 27:
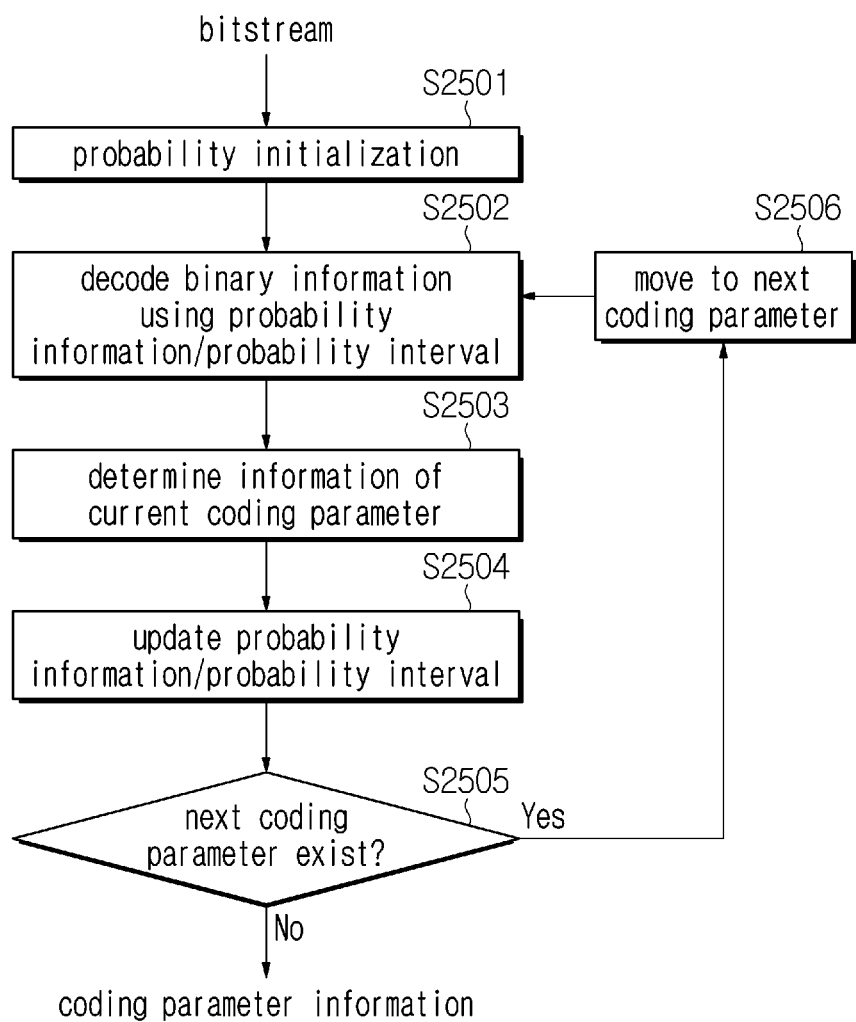
FIG. 27 is a view for describing an embodiment of a context-adaptive binary arithmetic decoding method.

FIG. 27 is a view for describing an embodiment of a context-adaptive binary arithmetic decoding method.

Unlike an encoding apparatus, in a decoding apparatus, the binary information of a coding parameter is decoded using probability information and an interval (S2502), and then the information of a current coding parameter is determined (S2503). Since the remaining decoding method of FIG. 27 corresponds to the encoding method of FIG. 26, no further detailed description will be provided.

In the step S2403 and the step S2502 of FIG. 26 and FIG. 12 described above, among M pieces of probability information that are preset using neighboring information for each coding parameter that is already reconstructed (or coding parameter), optimal probability information may be selectively used to perform encoding or decoding.

For example, as probability information of a coding parameter, probability information having a high probability of generating information according to the size of a transform block may be used.

Alternatively, probability information may be differently applied according to information of neighboring coefficients of a current coefficient to be encoded or decoded, and probability information of information to be currently encoded or decoded may be selected using probability information of previously encoded or decoded information.

FIG. 28 is a view illustrating an example in which probability information is applied differently according to information on peripheral coefficients.

FIG. 29 is a view illustrating an example of updated probability information.

FIG. 28 is an example of a probability information table used for encoding or decoding the Sig_coeff_flag information value of a current coefficient. When, among coefficients adjacent to a current coefficient to be encoded or decoded, the number of coefficients having the same information value as the Sig_coeff_flag information value of the current coefficient is 1, the index 8 is assigned to the current coefficient. Herein, the probability of symbol 1, which is the Sig_coeff_flag binary information of the current coefficient, is 61%, and the probability of symbol 0 is 39%. When the number of neighboring coefficients having the same information value as the Sig_coeff_flag information value of the current coefficient is 2, the index 5 is assigned to the current coefficient. Herein the probability of symbol 1, which is the Sig_coeff_flag binary information of the current coefficient, is 71% and the probability of symbol 0 is 29%. When the number of neighboring coefficients having the same information value as the Sig_coeff_flag information value of the current coefficient is 3, the index 2 is assigned to the current coefficient. Herein the probability of symbol 1, which is the Sig_coeff_flag binary information of the current coefficient, is 87% and the probability of symbol 0 is 13%.

After the current coefficient is encoded or decoded using the probability tables shown in FIG. 28, probability information may be updated as shown in FIG. 29.

Meanwhile, in the case of the non-zero coefficient information Sig_coeff_flag, the closer to the low-frequency region, probability information having a higher probability of occurrence of the non-zero coefficient information Sig_coeff_flag may be used.

In addition, the probability information of the current N excess coefficient information may be set by using the probability information of immediate previous N excess coefficient information that is encoded/decoded, or by using the probability information of N excess coefficient information that is initially encoded/decoded in units of sub-blocks. As described above, the N excess coefficient information may include Abs_greater1_flag, Abs_greater2_flag, and Abs_greater3_flag.

In addition, the sub-block information Coded-sub-blk-flag may use either the probability information of neighboring M sub-blocks that are encoded/decoded or the probability information of an immediately previous sub-block that is encoded/decoded.

Embodiment 1

Figure 30:
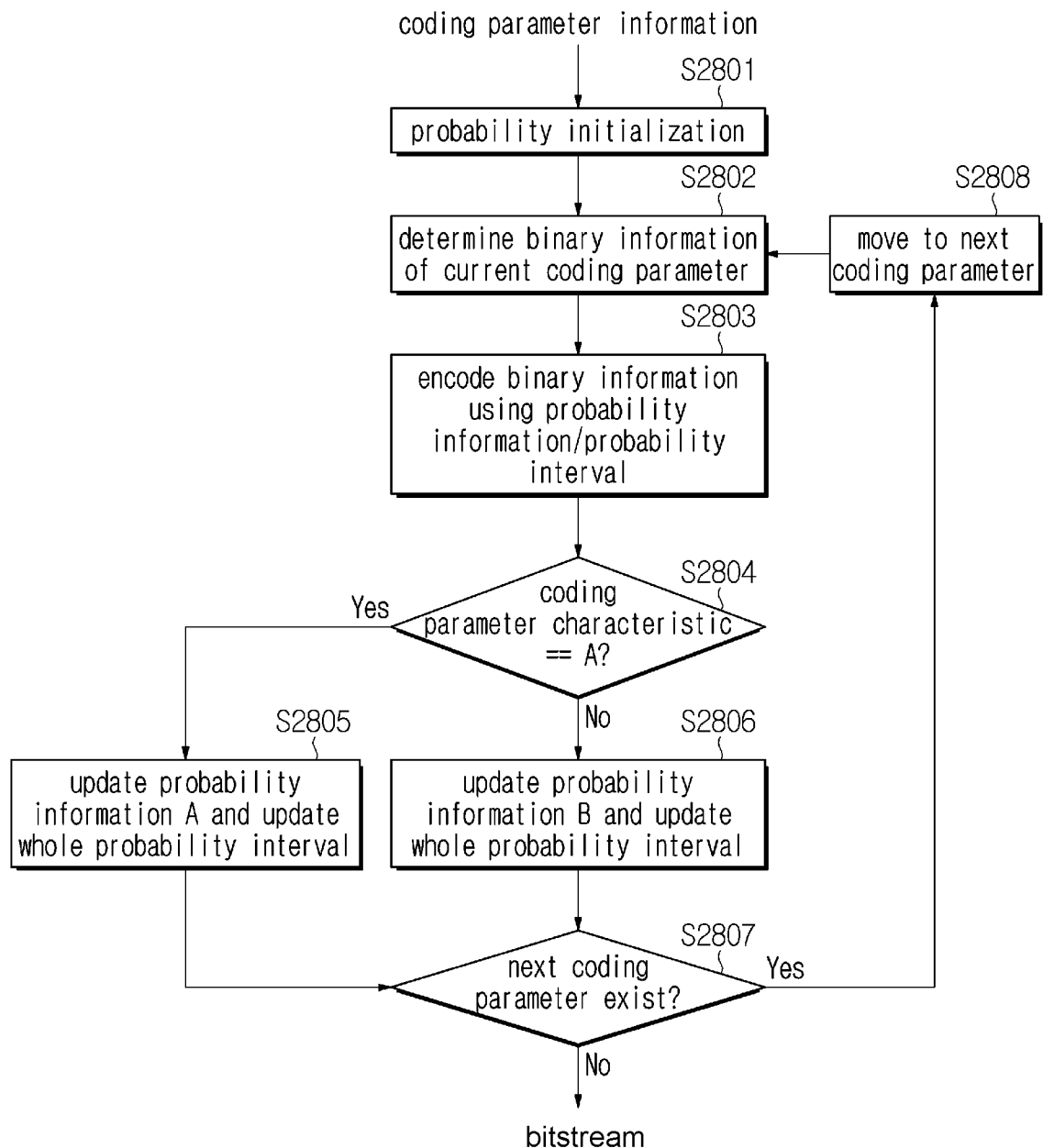
FIG. 30 is a view for describing a context-adaptive binary arithmetic coding method, which is adaptive to situations, according to an embodiment of the present disclosure.

FIG. 30 is a view for describing a context-adaptive binary arithmetic coding method, which is adaptive to situations, according to an embodiment of the present disclosure.

FIG. 30 adds the steps S2804, S2805 and S2806 to the process of FIG. 26. The steps S2804 to S2806 shows a process of independently updating a probability according to the characteristic of a previously encoded coding parameter by using K probability tables of coding parameter information. A and B represent respective characteristics of a coding parameter and may change in each encoded information. In this embodiment, for convenience of description, only two coding parameter characteristics are shown, but there may be K characteristics. Herein, K probability tables may have the same initial probability information or different initial probability information. Whether to use independently a same probability table or different probability tables as K initial probability tables may be determined through a method that is preset in an encoding/decoding apparatus or be transmitted in an upper header. Alternatively, it may be transmitted in each block. The remaining process except the steps S2804 to S2806 in FIG. 30 is the same as FIG. 26.

Figure 31:
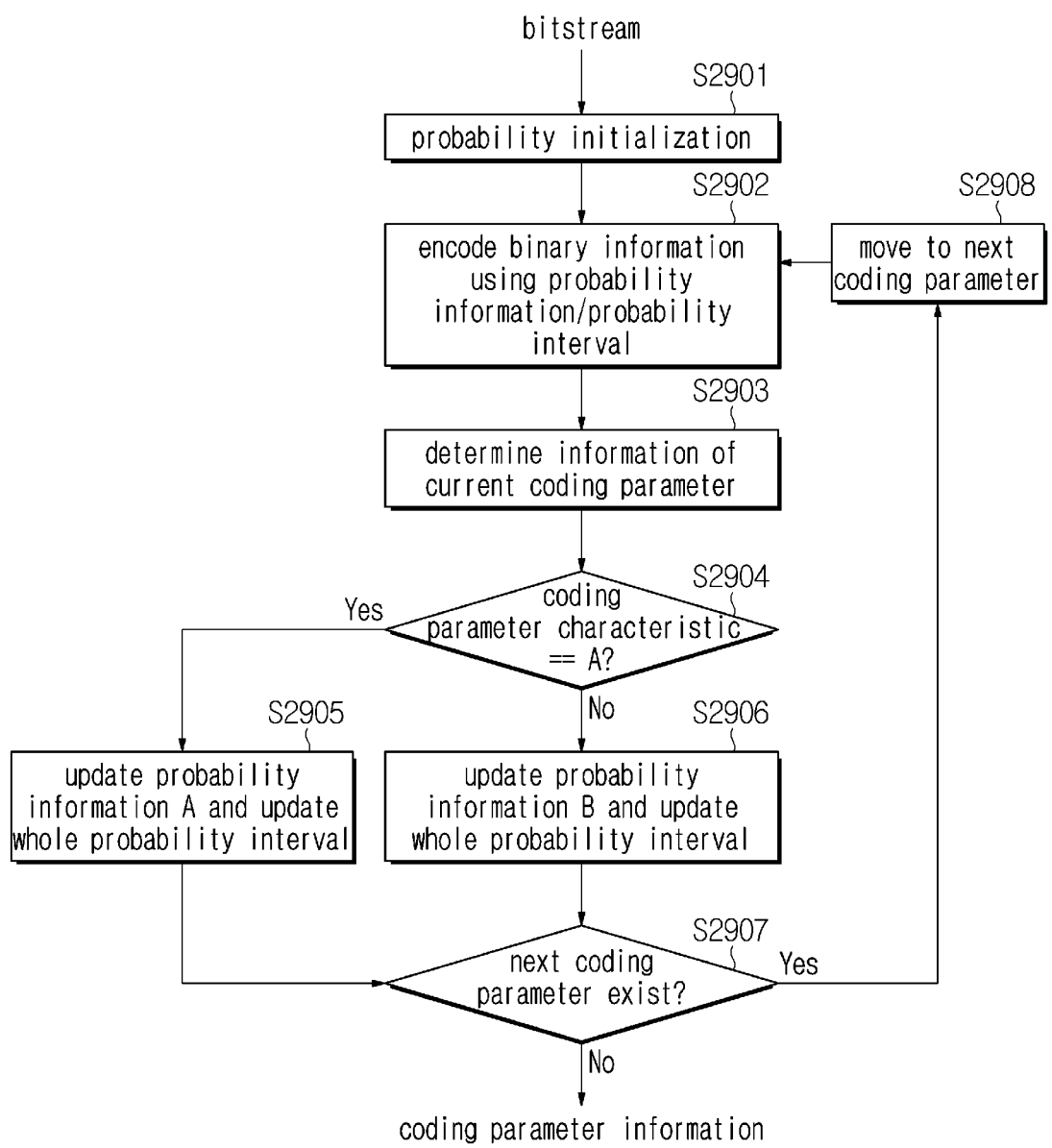
FIG. 31 is a view for describing a context-adaptive binary arithmetic decoding method, which is adaptive to situations, according to an embodiment of the present disclosure.

FIG. 31 is a view for describing a context-adaptive binary arithmetic decoding method, which is adaptive to situations, according to an embodiment of the present disclosure.

FIG. 31 adds the steps S2904, S2905 and S2906 to the process of FIG. 27. The steps S2904 to S2906 shows a process of independently updating a probability according to the characteristic of a previously decoded coding parameter by using K probability tables of coding parameter information. The remaining process except the steps S2904 to S2906 in FIG. 31 is the same as FIG. 27.

Figure 32:
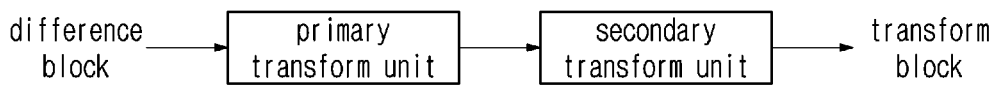
FIG. 32 is a view for describing an operation of a transform unit of an image encoding apparatus according to an embodiment of the present disclosure.

FIG. 32 is a view for describing an operation of a transform unit of an image encoding apparatus according to an embodiment of the present disclosure.

Figure 34:
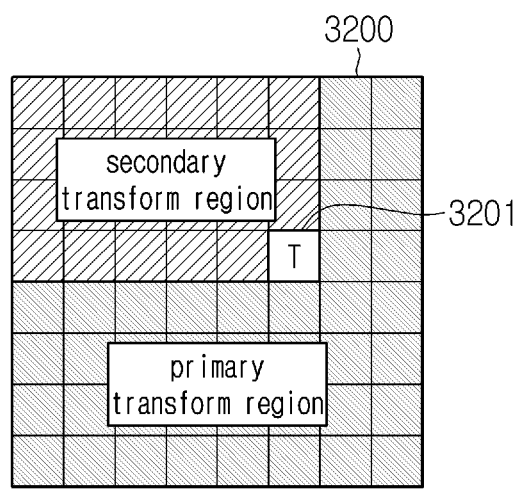
FIG. 34 is a view illustrating a secondary transform region in a transform block according to an embodiment of the present disclosure.

FIG. 34 is a view illustrating a secondary transform region in a transform block according to an embodiment of the present disclosure.

The primary transform unit of FIG. 32 performs the same process as the primary transform unit of FIG. 22. A secondary transform unit may perform secondary transform for all regions or some regions of a transform block that is generated in a primary transform unit. Whether or not to use a secondary transform unit may be transmitted for each block in an encoding apparatus or the secondary transform unit may be uniformly used by means of a rule that is preset in an encoding/decoding apparatus. Alternatively, it may be transmitted in an upper header. Herein, whether or not to apply secondary transform and information on a transform region may be determined by comparing RD-Cost.

As shown in FIG. 34, information on a secondary transform region may be set based on a non-zero coefficient T 3201 that comes last in a scan order.

Figure 33:
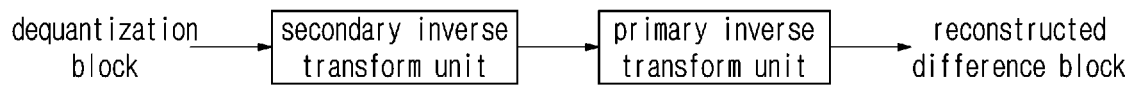
FIG. 33 is a view for describing an operation of an inverse transform unit of an image encoding/decoding apparatus according to an embodiment of the present disclosure.

FIG. 33 is a view for describing an operation of an inverse transform unit of an image encoding/decoding apparatus according to an embodiment of the present disclosure.

A secondary inverse transform unit decodes secondary transform information thereby determining whether or not to perform secondary inverse transform. When not performing secondary inverse transform, a reconstructed difference block is generated directly by primary inverse transform. When performing secondary inverse transform, secondary transform region information is decoded and inverse transform is performed only for a secondary transform region. Next, primary inverse transform is performed for the whole block and thus a reconstructed difference block is generated.

Figure 35:
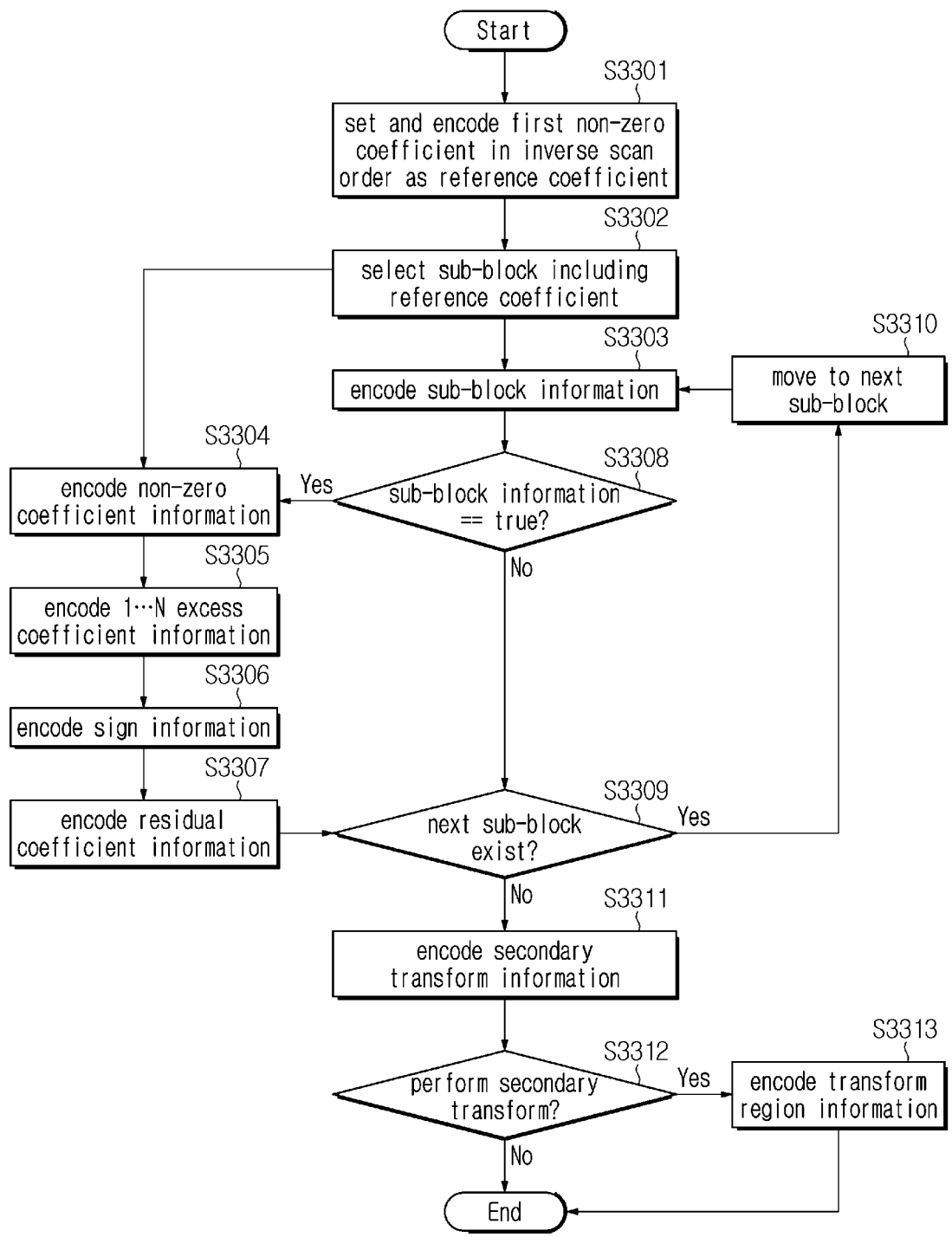
FIG. 35 is a view for describing a method of encoding a transform block according to an embodiment of the present disclosure.

FIG. 35 is a view for describing a method of encoding a transform block according to an embodiment of the present disclosure.

The transform block encoding method of FIG. 35 may be implemented by the entropy encoding unit 107 of the image encoding apparatus 100.

The steps S3301 to S3310 perform the same process as the steps S2201 to S2210 of FIG. 24. When secondary transform is applied after encoding secondary transform information, transform region information is encoded. When secondary transform is not applied, the process ends.

Figure 36:
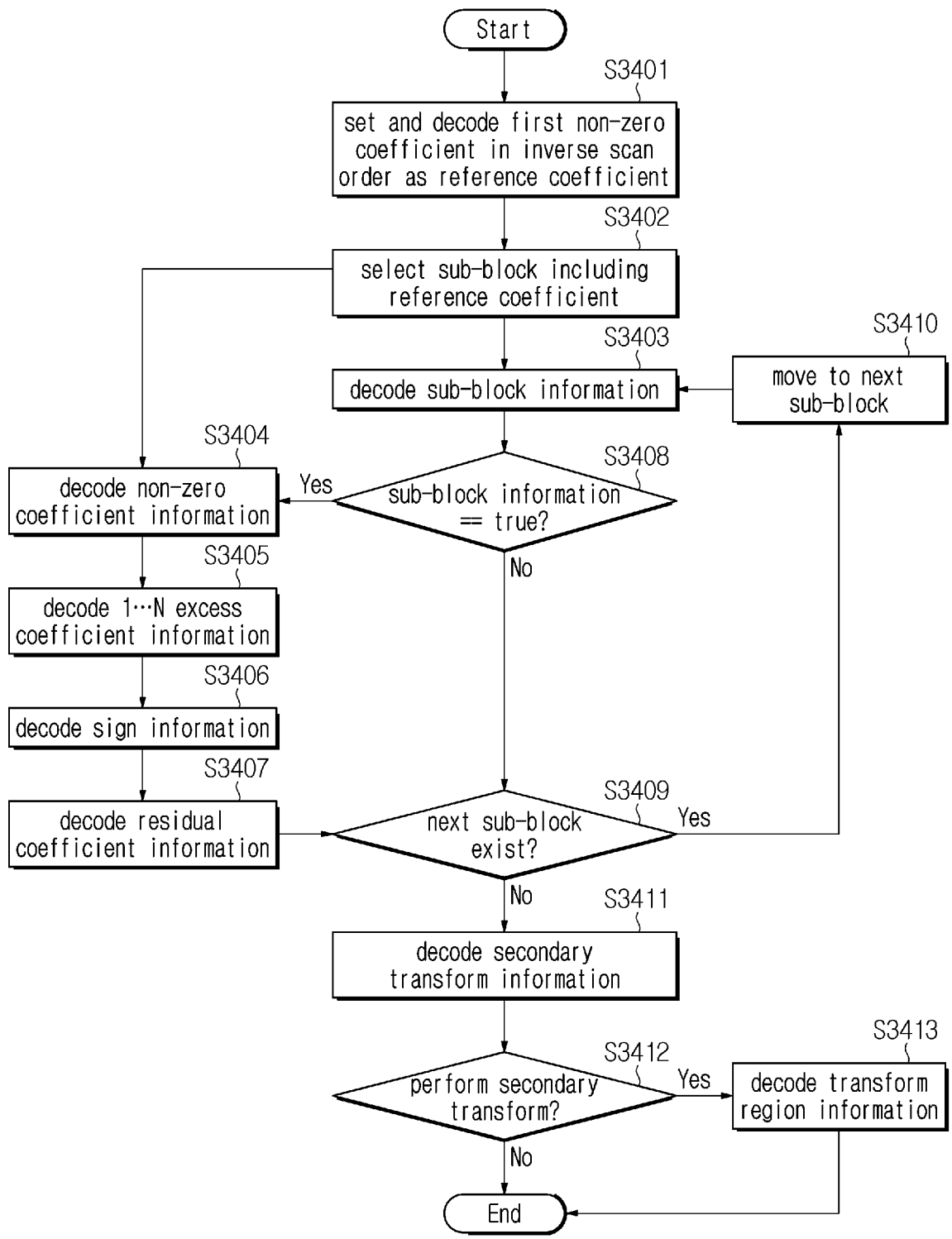
FIG. 36 is a view for describing a method of decoding a transform block according to an embodiment of the present disclosure.

FIG. 36 is a view for describing a method of decoding a transform block according to an embodiment of the present disclosure.

The transform block decoding method of FIG. 36 may be implemented by the entropy decoding unit 401 of the image decoding apparatus 400.

The steps S3401 to S3410 perform the same process as the steps S2301 to S2310 of FIG. 25. When secondary transform is applied after decoding secondary transform information, transform region information is decoded. When secondary transform is not applied, the process ends.

Hereinafter, the embodiments of FIG. 30 and FIG. 31 will be described with reference to FIG. 28, FIG. 29, FIG. 32 and FIG. 33.

When secondary transform is set as the characteristic of a coding parameter, two probability tables of transform coefficient information may be each used according to a position of a current coefficient in a quantized transform block. For example, when deriving the probability information of Sig_coeff_flag, if a current coefficient exists in a secondary transform region, the probability table 2600 of FIG. 28 may be used, and if the current coefficient exists in a primary transform region, the probability table 2601 of FIG. 28 may be used to update independently the probability information of Sig_coeff_flag (S2805, S2806, S2905 and S2906).

The probability table 2700 of FIG. 29 is an update result of probability information obtained by determining the probability table index information as 5 according to the number of non-zero coefficients adjacent to a current coefficient in the initial probability table 2600 of FIG. 28.

The probability table 2701 of FIG. 29 is an update result of probability information obtained by determining the probability table index information as 8 according to the number of non-zero coefficients adjacent to a current coefficient in the initial probability table 2601 of FIG. 28.

In the same principle as the above-described embodiment, other information on quantized transform coefficients like Abs_greater1_flag, Abs_greater2_flag, and Coded_sub_blk_flag may use adaptively or independently a probability table according to whether a current coefficient is located in a secondary transform region or a primary transform region.

In FIG. 30 and FIG. 31, a coding parameter characteristic may be determined as prediction information.

When prediction information is set as the characteristic of a coding parameter, two probability tables of transform coefficient information may be each used according to a prediction mode of a current block. For example, when deriving the probability information of Sig_coeff_flag, if the prediction mode of a current block is an intra prediction mode, the probability table 2600 of FIG. 28 may be used, and if the prediction mode of a current block is an inter prediction mode, the probability table 2601 of FIG. 28 may be used to update independently the probability information of Sig_coeff_flag (S2805, S2806, S2905 and S2906).

The probability table 2700 of FIG. 29 is an update result of probability information obtained by determining the probability table index information as 5 according to the number of non-zero coefficients adjacent to a current coefficient in the initial probability table 2600 of FIG. 28.

The probability table 2701 of FIG. 29 is an update result of probability information obtained by determining the probability table index information as 8 according to the number of non-zero coefficients adjacent to a current coefficient in the initial probability table 2601 of FIG. 28.

In the same principle as the above-described embodiment, other information on quantized transform coefficients like Abs_greater1_flag, Abs_greater2_flag, and Coded_sub_blk_flag may use adaptively or independently a probability table according to a prediction mode of a current block.

Alternatively, the coding parameter characteristic of FIG. 30 and FIG. 31 may be determined as prediction information and secondary transform. When prediction information and secondary transform are set as the characteristic of a coding parameter, four probability tables of transform coefficient information may be each used according to a prediction mode of a current block and a position of a current coefficient. For example, when deriving the probability information of Sig_coeff_flag, if the prediction mode of a current block is intra prediction and the position of a current coefficient is a secondary region, the probability table 1 may be used, and if the prediction mode of the current block is intra prediction and the position of the current coefficient is a primary region, the probability table 2 may be used to derive probability information and to perform update. In addition, if the prediction mode of the current block is inter prediction and the position of the current coefficient is a secondary region, the probability table 3 may be used, and if the prediction mode of the current block is inter prediction and the position of the current coefficient is a primary region, the probability table 4 may be used to derive probability information and to perform update.

In the same principle as the above-described embodiment, other information on quantized transform coefficients like Abs_greater1_flag, Abs_greater2_flag, and Coded_sub_blk_flag may use adaptively or independently a probability table according to a prediction mode of a current block and whether or not to perform secondary transform of a current coefficient.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure maybe implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

INDUSTRIAL APPLICABILITY

The present disclosure may be used to encode/decode an image.

The invention claimed is:
1. An image decoding method, the method comprising:
determining a reference pixel line of a current block based on reference pixel line information for the current block when an intra prediction is applied to the current block;
determining an intra prediction mode of the current block, wherein the intra prediction mode of the current block is determined based on the reference pixel line information for the current block when the intra prediction is applied to the current block;
determining whether a unidirectional prediction or a bidirectional prediction is performed based on the intra prediction mode of the current block; and
generating a prediction block of the current block by performing one of the unidirectional prediction or the bidirectional prediction,
wherein the unidirectional prediction comprises generating the unidirectional prediction value of the current block by using a first reference pixel associated with a current pixel in the current block on a first reference pixel line according to a prediction direction of the intra prediction mode,
wherein the bidirectional prediction comprises generating the bidirectional prediction value of the current block by using a second reference pixel associated with the current pixel in the current block on a second reference pixel line according to an inverse direction of the prediction direction of the intra prediction mode,
wherein the second reference pixel is determined by using an inverse direction of the prediction direction associated with the first reference pixel and the second reference pixel line is immediately adjacent to the current block in the inverse direction of the prediction direction of the intra prediction mode, wherein, the bidirectional prediction value of the current block is determined based on a first weight for the unidirectional prediction and a second weight for the bidirectional prediction, and the first weight for the unidirectional prediction and the second weight for the bidirectional prediction are determined based on the intra prediction mode of the current block, and wherein the first weight for the unidirectional prediction is determined to be greater than the second weight for the bidirectional prediction regardless of a location of the current pixel, a distance between the current pixel and each of reference pixels including the first reference pixel and the second reference pixel, a size of the current block, and a shape of the current block.

2. The image decoding method of claim 1, wherein the prediction direction of the intra prediction mode is an upper-right direction and the inverse direction of the prediction direction is a lower-left direction.

3. An image encoding method, the method comprising:
determining reference pixel line information for a current block indicating a reference pixel line of the current block when an intra prediction is applied to the current block and encoding the reference pixel line information;
determining an intra prediction mode of a current block based on the reference pixel line information for the current block when the intra prediction is applied to the current block and encoding the intra prediction mode of the current block;
determining whether a unidirectional prediction or a bidirectional prediction is performed based on the intra prediction mode of the current block; and
generating a prediction block of the current block by performing one of the unidirectional prediction or the bidirectional prediction,
wherein the unidirectional prediction comprises generating the unidirectional prediction value of the current block by using a first reference pixel associated with a current pixel in the current block on a first reference pixel line according to a prediction direction of the intra prediction mode,
wherein the bidirectional prediction comprises generating the bidirectional prediction value of the current block by using a second reference pixel associated with the current pixel in the current block on a second reference pixel line according to an inverse direction of the prediction direction of the intra prediction mode,
wherein the second reference pixel is determined by using an inverse direction of the prediction direction associated with the first reference pixel and the second reference pixel line is immediately adjacent to the current block in the inverse direction of the prediction direction of the intra prediction mode,
wherein, the bidirectional prediction value of the current block is determined based on a first weight for the unidirectional prediction and a second weight for the bidirectional prediction, and the first weight for the unidirectional prediction and the second weight for the bidirectional prediction are determined based on the intra prediction mode of the current block, and wherein the first weight for the unidirectional prediction is determined to be greater than the second weight for the bidirectional prediction regardless of a location of the current pixel, a distance between the current pixel and each of reference pixels including the first reference pixel and the second reference pixel, a size of the current block, and a shape of the current block.

4. The image encoding method of claim 3, wherein the prediction direction of the intra prediction mode is an upper-right direction and the inverse direction of the prediction direction is a lower-left direction.

5. A non-transitory computer-readable recording medium storing a bitstream including video data,
wherein the bitstream is encoded by a video encoding method, and
the video encoding method comprising:
determining a reference pixel line of a current block based on reference pixel line information for the current block when an intra prediction is applied to the current block and encoding the reference pixel line information;
determining an intra prediction mode of the current block based on the reference pixel line information for the current block when the intra prediction is applied to the current block and encoding the intra prediction mode of the current block;
determining whether a unidirectional prediction or a bidirectional prediction is performed based on the intra prediction mode of the current block; and
generating a prediction block of the current block by performing one of the unidirectional prediction or the bidirectional prediction,
wherein the unidirectional prediction comprises generating the unidirectional prediction value of the current block by using a first reference pixel associated with a current pixel in the current block on a first reference pixel line according to a prediction direction of the intra prediction mode,
wherein the bidirectional prediction comprises generating the bidirectional prediction value of the current block by using a second reference pixel associated with the current pixel in the current block on a second reference pixel line according to an inverse direction of the prediction direction of the intra prediction mode,
wherein the second reference pixel is determined by using an inverse direction of the prediction direction associated with the first reference pixel and the second reference pixel line is immediately adjacent to the current block in the inverse direction of the prediction direction of the intra prediction mode,
wherein, the bidirectional prediction value of the current block is determined based on a first weight for the unidirectional prediction and a second weight for the bidirectional prediction, and the first weight for the unidirectional prediction and the second weight for the bidirectional prediction are determined based on the intra prediction mode of the current block, and
wherein the first weight for the unidirectional prediction is determined to be equal to or greater than the second weight for the bidirectional prediction regardless of a location of the current pixel, a distance between the first and second reference pixels and the current pixel, a size of the current block, and a shape of the current block.

* * * * *